(12) United States Patent
Webel et al.

(10) Patent No.: US 11,694,379 B1
(45) Date of Patent: Jul. 4, 2023

(54) ANIMATION MODIFICATION FOR OPTICAL SEE-THROUGH DISPLAYS

(71) Applicant: Apple Inc., Cupertino, CA (US)

(72) Inventors: Sabine Webel, San Francisco, CA (US); Olivier Denis Roger Gutknecht, San Francisco, CA (US); Pal Kristian Engstad, Los Angeles, CA (US); Ivan Gavrenkov, Palo Alto, CA (US); Tobias Eble, Sunnyvale, CA (US); Shruti Singhal, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/160,789

(22) Filed: Jan. 28, 2021

Related U.S. Application Data

(60) Provisional application No. 63/000,200, filed on Mar. 26, 2020.

(51) Int. Cl.
*G06T 13/00* (2011.01)
*G02B 27/01* (2006.01)
*G06T 19/20* (2011.01)
*G06T 19/00* (2011.01)

(52) U.S. Cl.
CPC .......... *G06T 13/00* (2013.01); *G02B 27/0172* (2013.01); *G06T 19/006* (2013.01); *G06T 19/20* (2013.01)

(58) Field of Classification Search
CPC ....... G06T 13/00; G06T 19/006; G06T 19/20; G02B 27/0172
See application file for complete search history.

(56) References Cited

U.S. PATENT DOCUMENTS

| 6,146,275 | A | * | 11/2000 | Asai | ........................ | A63F 13/10 |
|---|---|---|---|---|---|---|
| | | | | | | 463/31 |
| 2017/0277955 | A1 | * | 9/2017 | Liu | ...................... | G06K 9/6298 |
| 2019/0221029 | A1 | * | 7/2019 | Yoneda | ................... | G06T 15/20 |
| 2020/0342653 | A1 | * | 10/2020 | Dupuis | ................... | G06T 15/08 |
| 2021/0042534 | A1 | * | 2/2021 | Hayashida | ............ | B60W 50/14 |
| 2022/0237849 | A1 | * | 7/2022 | Lindh | ..................... | G06F 9/505 |

* cited by examiner

*Primary Examiner* — Chong Wu
(74) *Attorney, Agent, or Firm* — Fernando & Partners, LLP

(57) ABSTRACT

In one implementation, a method of displaying an animation is performed at a device including an optical see-through display, one or more processors, and a non-transitory memory. The method includes receiving a request to display a first animation of an object exhibiting a response characteristic. The method includes determining a metric characterizing an amount of processing power for the device to display the first animation on the optical see-through display. The method includes, in response to a determination that the metric exceeds a threshold associated with the device, selecting a second animation of the object exhibiting the response characteristic. The method includes displaying the second animation.

25 Claims, 22 Drawing Sheets

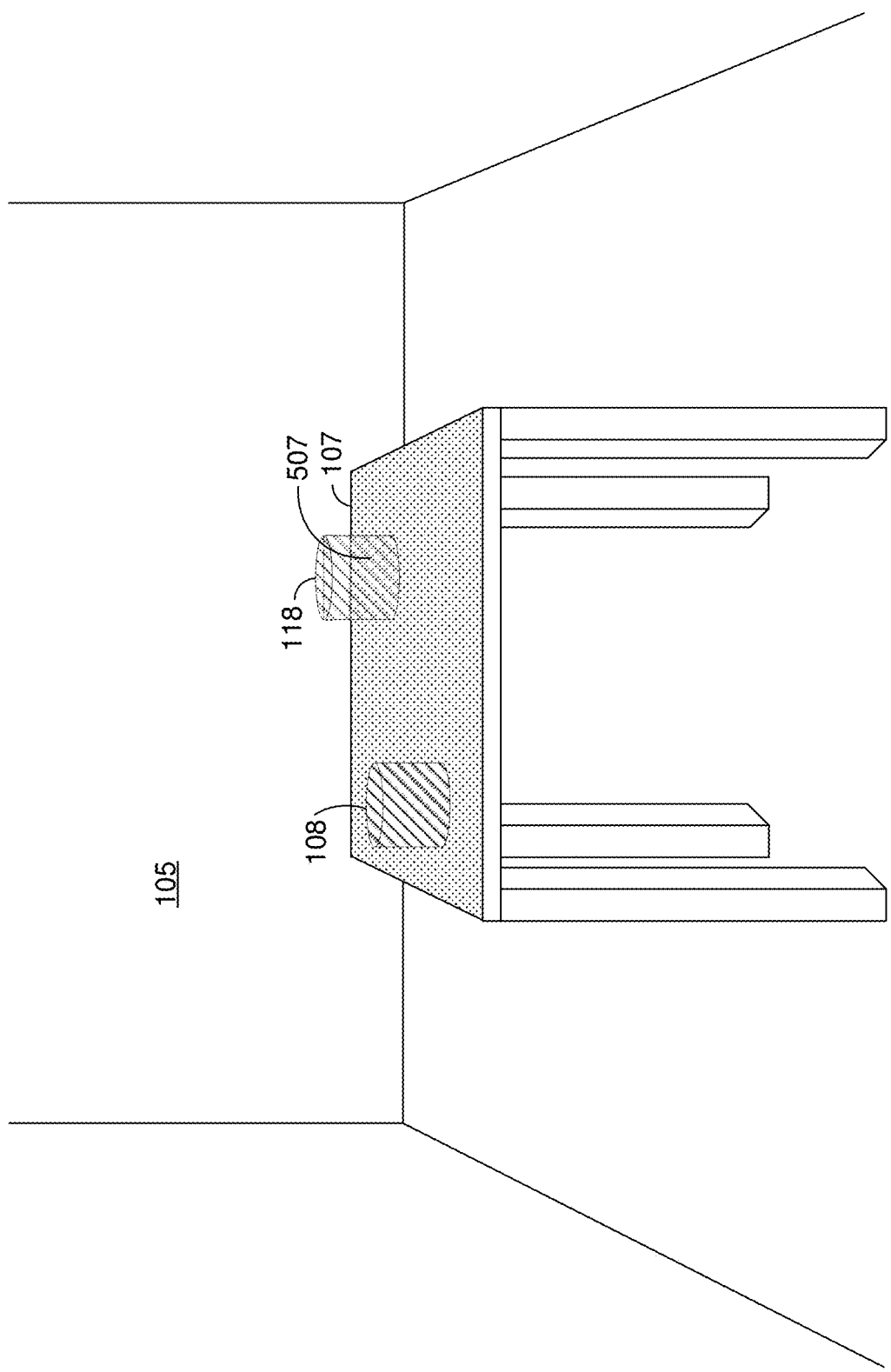

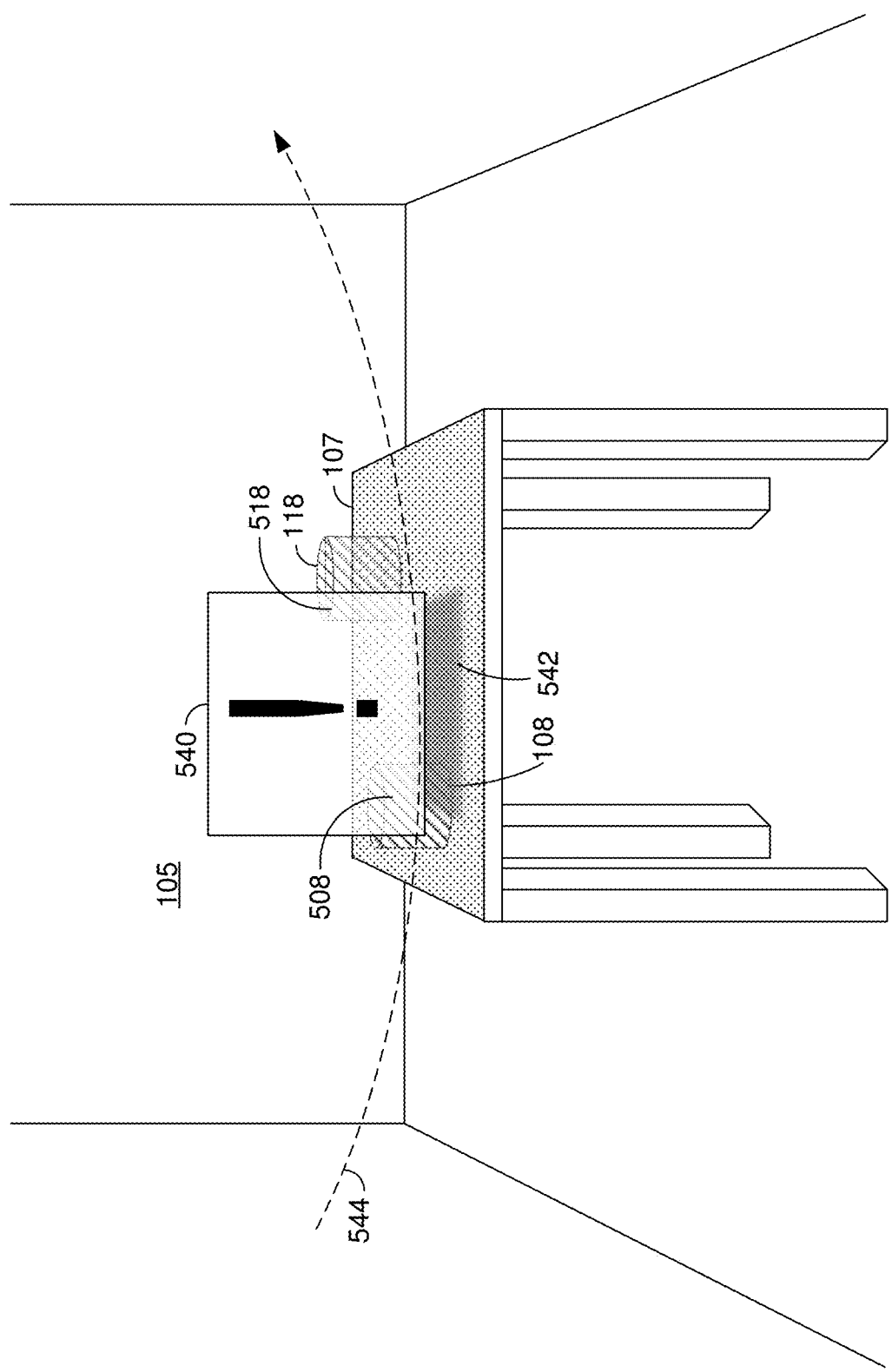

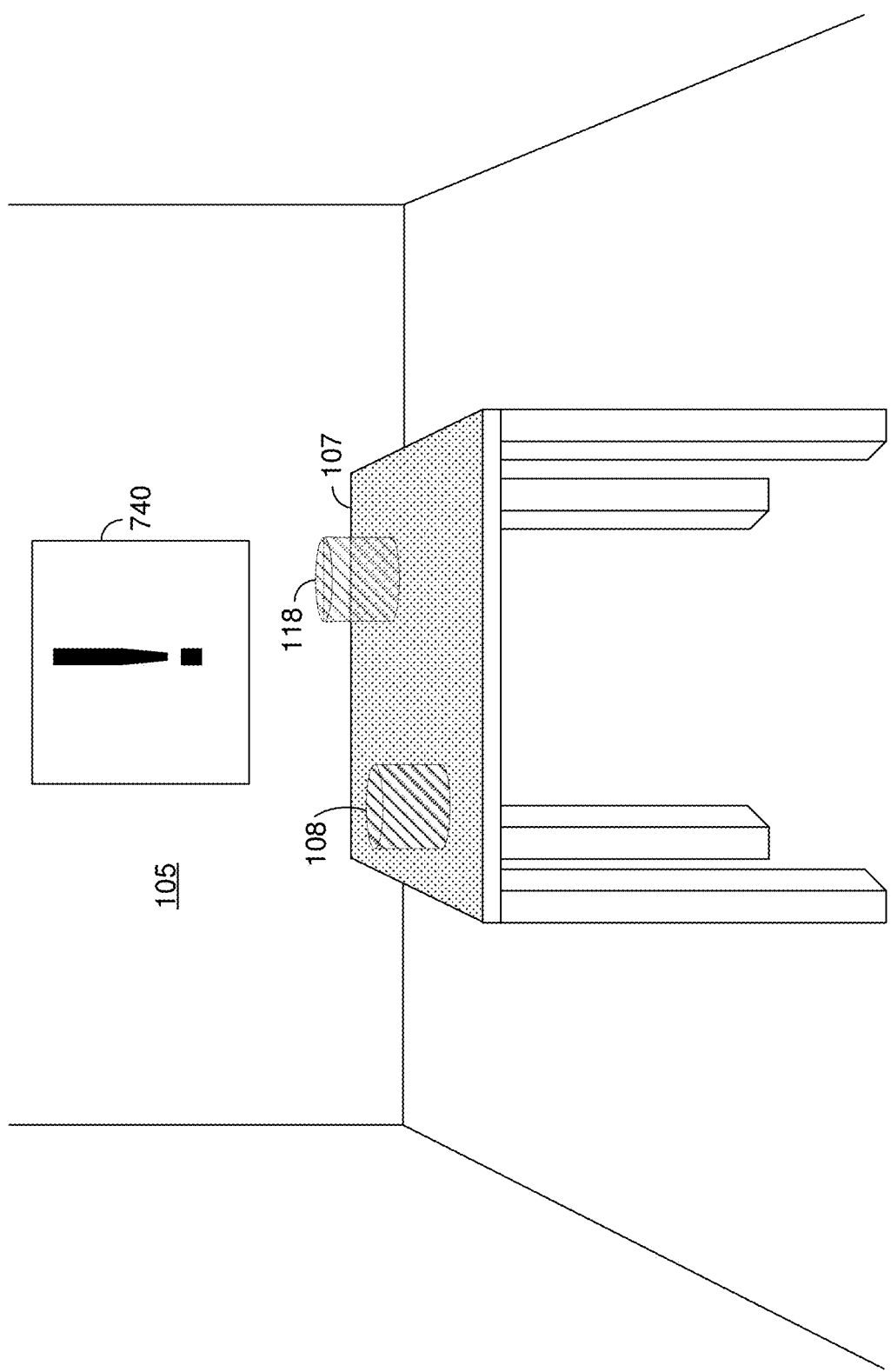

800

At a device including an optical see-through display, one or more processors, and a non-transitory memory:

Receiving a request to display a first animation of an object exhibiting a response characteristic ⎯810

Determining a metric characterizing an amount of processing power for the device to display the first animation on the optical see-through display ⎯820

In response to a determination that the metric is greater than a threshold associated with the device, selecting a second animation of the object exhibiting the response characteristic ⎯830

Displaying the second animation ⎯830

Figure 8

ANIMATION MODIFICATION FOR OPTICAL SEE-THROUGH DISPLAYS

CROSS-REFERENCE TO RELATED APPLICATIONS

This application claims priority to U.S. Provisional Patent App. No. 63/000,200, filed on Mar. 26, 2020, and hereby incorporated by reference herein in its entirety.

TECHNICAL FIELD

The present disclosure generally relates to optical see-through displays and, in particular, to systems, methods, and devices for modifying animations for display on optical see-through displays.

BACKGROUND

In various implementations, an application requests that an animation of an object be displayed in an extended reality (XR) environment. In various circumstances, different amounts of processing power may be necessary or required to render the animation for display on a video pass-through display and to render the animation for display on an optical see-through display. In particular, rendering the animation for display on an optical see-through display may be more complicated and/or more computationally intensive in view of various aspects of the optical see-through display. In various implementations, the amount of processing power needed to render the animation for display on an optical see-through display is greater than the amount of available processing power.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 5A-5D illustrate the animation of the virtual alert on an optical see-through display in accordance with various implementations.

FIGS. 7A-7D illustrate an alternate animation of the virtual alert on the optical see-through display in accordance with various implementations.

FIG. 8 is a flowchart representation of a method of animating an object on an optical see-through display in accordance with some implementations.

Figure 1A:
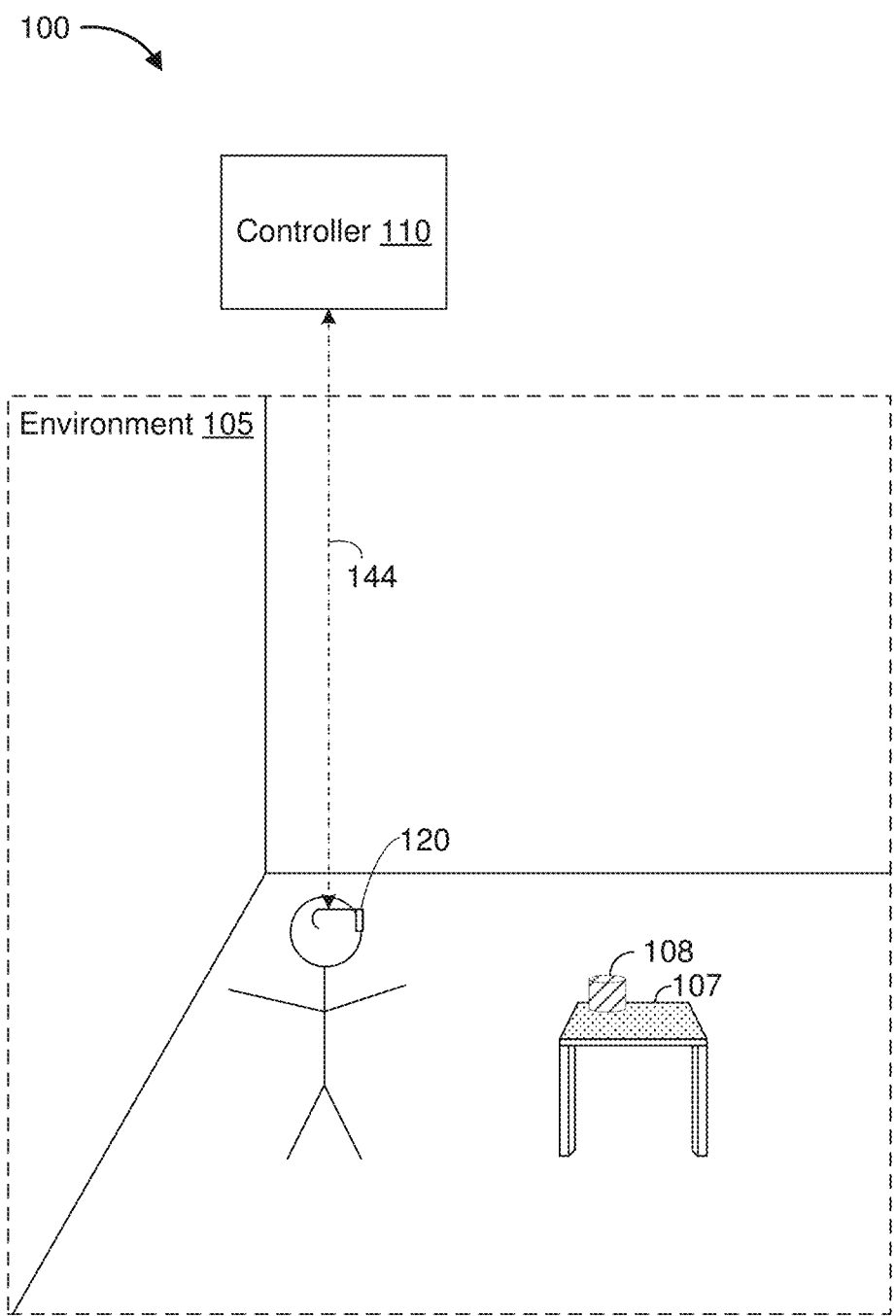
FIG. 1A is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for displaying an animation on an optical see-through display. In various implementations, a method is performed at a device including an optical see-through display, one or more processors, and a non-transitory memory. The method includes receiving a request to display a first animation of an object exhibiting a response characteristic. The method includes determining a metric characterizing an amount of processing power for the device to display the first animation on the optical see-through display. The method includes, in response to a determination that the metric exceeds a threshold associated with the device, selecting a second animation of the object exhibiting the response characteristic. The method includes displaying the second animation.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

Various head-mounted devices (HMDs) include a video pass-through display that is opaque and operates in a video pass-through display mode to display an image of an XR environment based on a captured image of a physical environment (e.g., with additional XR content and/or alternations to the physical environment). Further, various HMDs include an optical see-through display that is at least partially transparent and operates in an optical see-through display mode to display XR content while a user wearing the HMD can see through the optical see-through display to view the physical environment. Various HMDs include a transitional display which can be operated in an optical see-through display mode in which the transitional display is at least partially transparent and displays XR content while a user wearing the HMD can see through the transitional display to view the physical environment or in a video pass-through display mode in which the transitional display is opaque and displays an image of an XR environment based on a captured image of the physical environment. As used herein, the term "optical see-through display" includes a transitional display operating in an optical see-through display mode and the term "video pass-through display" includes a transitional display operating in a video pass-through display mode. Thus, a transitional display includes an optical see-through display and a video pass-through display.

In various implementations, an application executed by an HMD generates a request to display an animation of an XR object on a display. In various implementations, the amount of processing power it would take to render the animation for an optical see-through display differs (e.g., is greater) than the amount of processing power it would take to render the animation for a video pass-through display. In various implementations, the amount of processing power it would take to render the animation for an optical see-through display is greater than the amount of available processing power of the HMD. In various implementations, the amount of processing power it would take to render the animation for an optical see-through display is greater than the amount of available processing power of the HMD even when the amount of processing power it would take to render the animation for a video pass-through display is not greater than the amount of available processing power of the HMD.

Accordingly, in various implementations, in response to a request to display an animation of an object exhibiting a response characteristic, the HMD determines an amount of processing power for the device to display the animation. If that amount is above a threshold (e.g., an amount of available processing power of the HMD), the HMD modifies the animation (or replaces the animation with a different animation exhibiting the response characteristic) before displaying the animation such that the amount of processing power for the device to display the animation is below the threshold.

FIG. 1A is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes a controller 110 and a head-mounted device (HMD) 120 within a physical environment 105 including a table 107 and a real cylinder 108 upon the table 107.

In some implementations, the controller 110 is configured to present XR content to the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the real environment 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.). In another example, the controller 110 is included within the enclosure of the HMD 120.

Figure 1B:
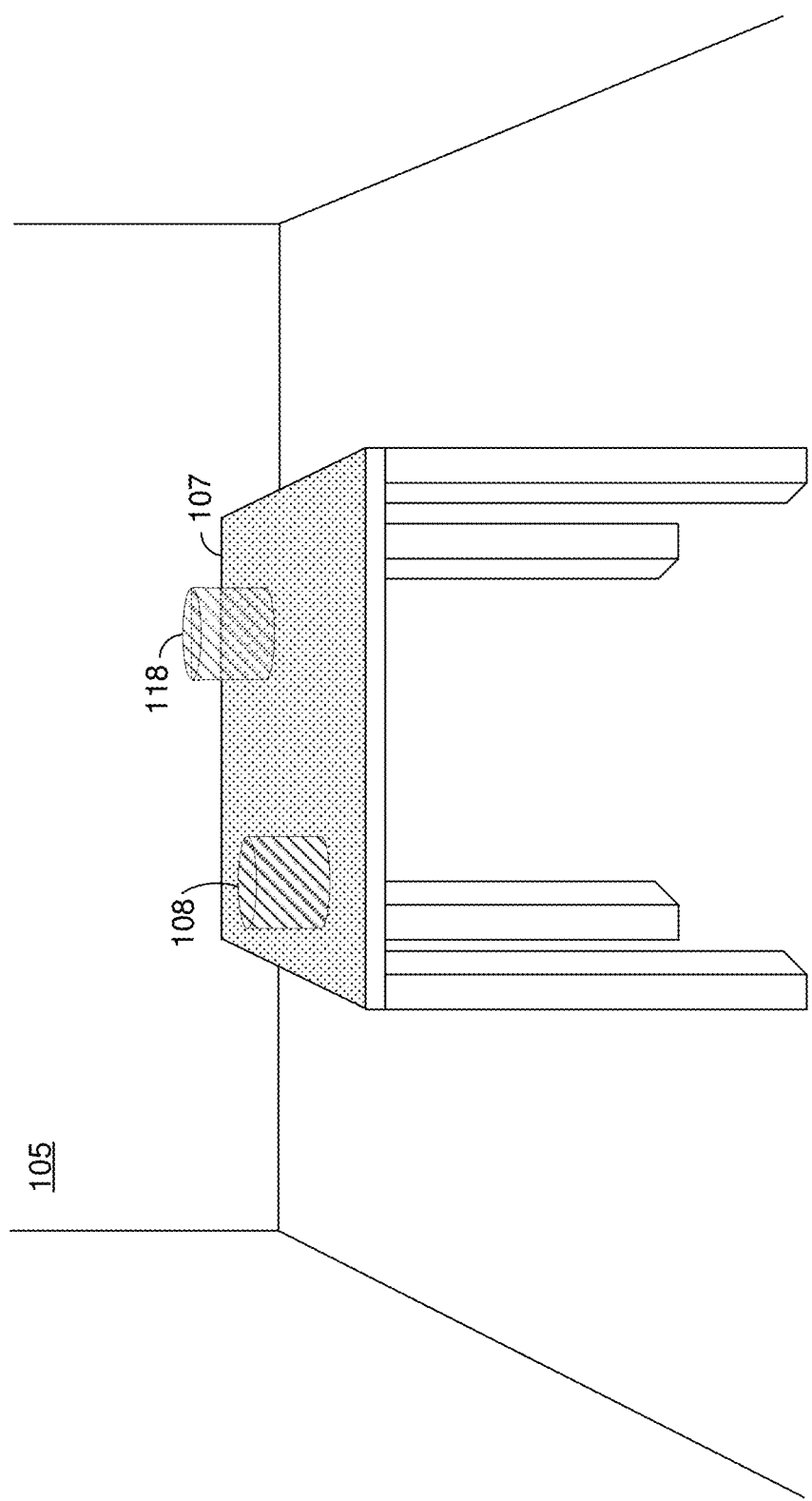
FIG. 1B is a perspective view of an XR environment in accordance with some implementations.

According to some implementations, the HMD 120 displays XR content to the user while the user is virtually and/or physically present within the physical environment 105. For example, FIG. 1B illustrates the physical environment 105 from the perspective of the user in which the table 107 and the real cylinder 108 is visible. Also visible is a virtual cylinder 118 (displayed by the HMD 120) upon the table 107.

In various implementations, an optical see-through display includes light-emitting pixels. The light-emitting pixels can be controlled to present XR content to the user. However, in various implementations, the light-emitting pixels (and/or spaces between the light-emitting pixels) are at least partially transparent. Thus, the light-emitting pixels do not block light from the physical environment from reaching the eye of the user, but only add light to the light from the physical environment. Accordingly, in various implementations, the optical see-through display is an additive display. Thus, as shown in FIG. 1B, the table 107 is partially visible through the virtual cylinder 118, but not through the real cylinder 108.

In some implementations, the HMD 120 includes a suitable combination of software, firmware, and/or hardware. The HMD 120 is described in greater detail below with respect to FIG. 3A. In some implementations, the functionalities of the controller 110 are provided by and/or combined with the HMD 120.

In some implementations, the user wears the HMD 120 on his/her head. As such, the HMD 120 includes one or more XR displays provided to display the XR content. For example, in various implementations, the HMD 120 encloses the field-of-view of the user. In some implementations, the HMD 120 is replaced with a handheld device (such as a smartphone or tablet) configured to present XR content, and rather than wearing the HMD 120 the user holds the device with a display directed towards the field-of-view of the user and a camera directed towards the physical environment 105. In some implementations, the handheld device can be placed within an enclosure that can be worn on the head of the user (e.g., a head-mounted enclosure (HME)). In some implementations, the HMD 120 is replaced with an XR chamber, enclosure, or room configured to present XR content in which the user does not wear or hold the HMD 120.

Figure 2:
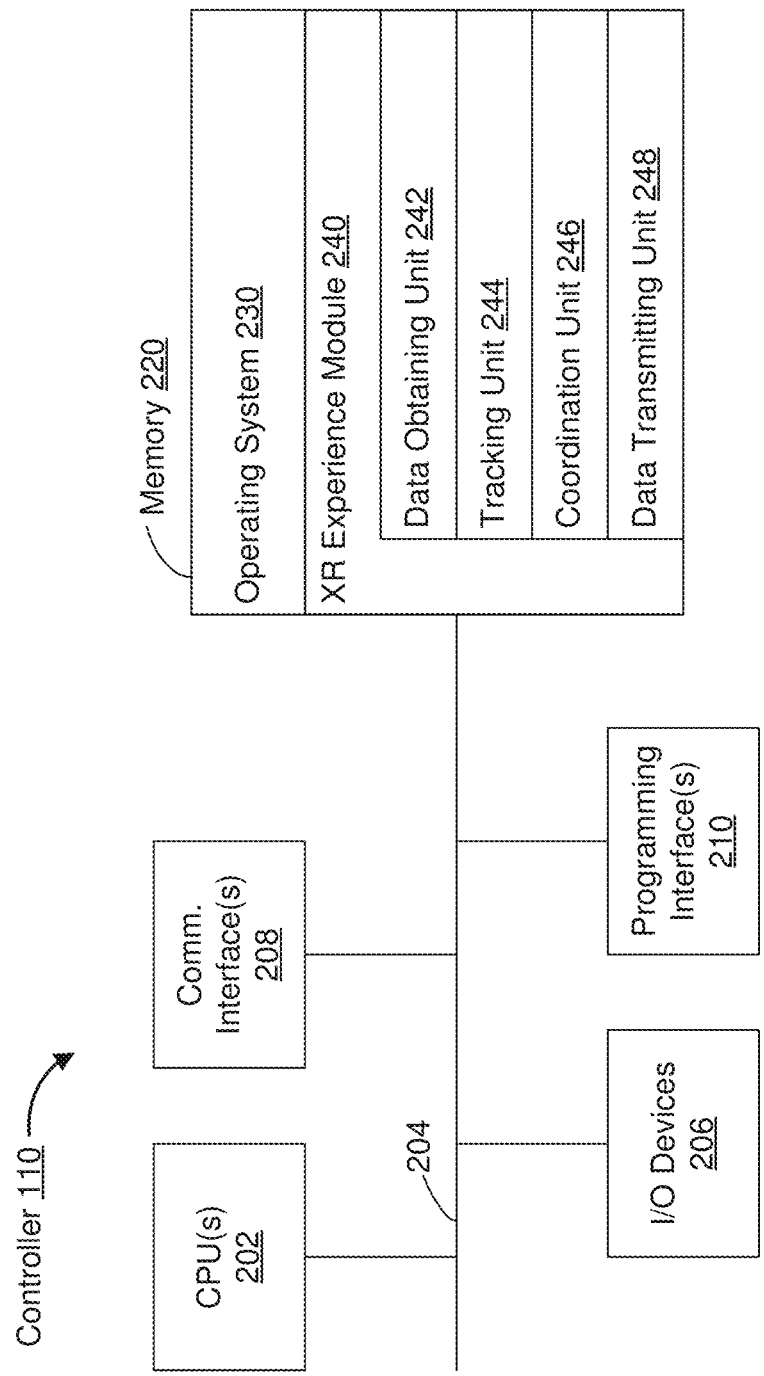
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120 of FIG. 1A. To that end, in various implementations, the data obtaining unit 242 includes instructions and/or logic therefor, and heuristics and metadata therefor.

In some implementations, the tracking unit 244 is configured to map the scene (e.g., the physical environment 105) and to track the position/location of at least the HMD 120 with respect to the scene (e.g., the physical environment 105 of FIG. 1A). To that end, in various implementations, the tracking unit 244 includes instructions and/or logic therefor, and heuristics and metadata therefor.

In some implementations, the coordination unit 246 is configured to manage and coordinate the XR experience presented to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3A:
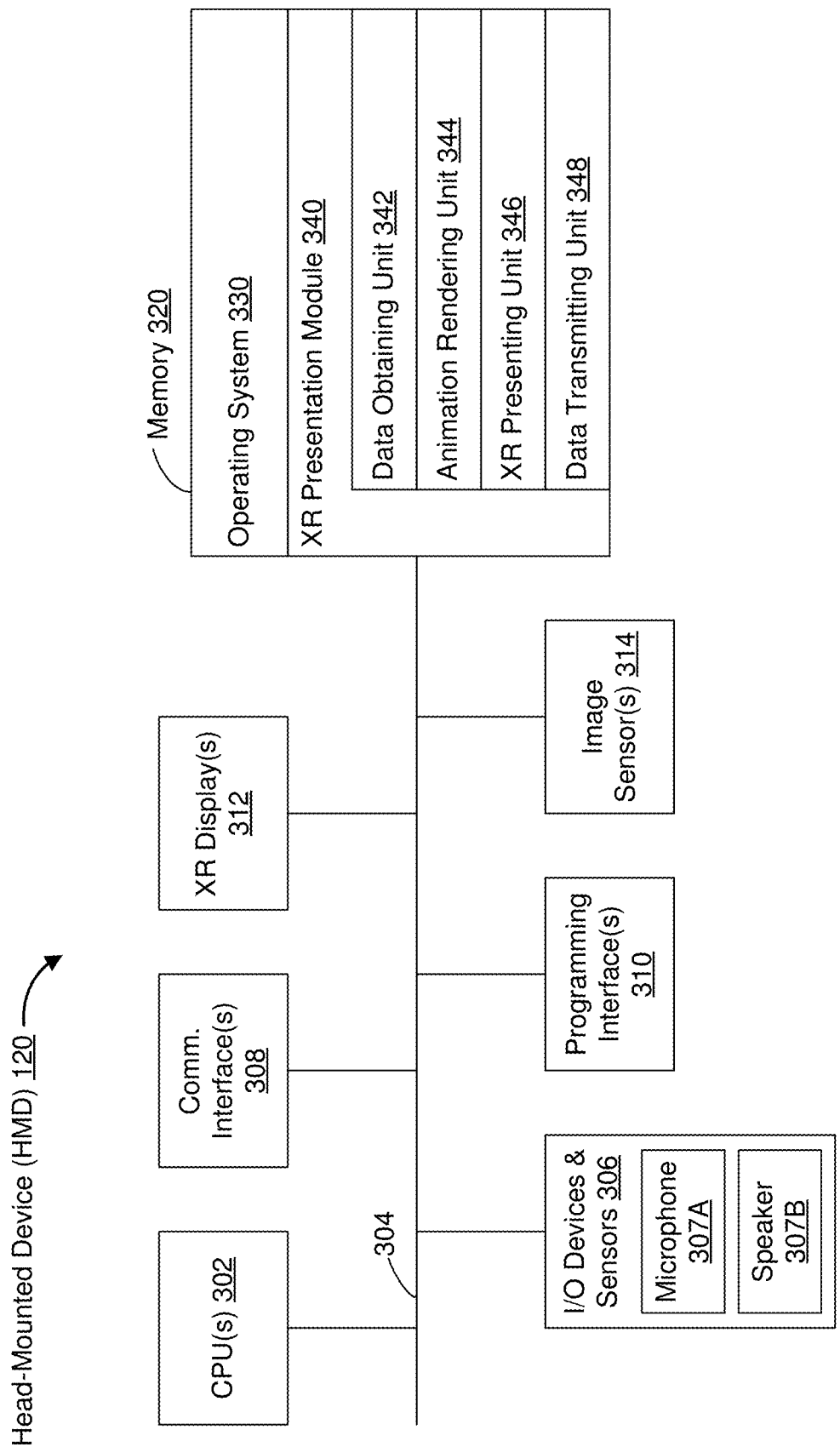
FIG. 3A is a block diagram of an example head-mounted device (HMD) in accordance with some implementations.

FIG. 3A is a block diagram of an example of the HMD 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 307A, one or more speakers 307B, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the HMD 120 includes a single XR display. In another example, the HMD 120 includes an XR display for each eye of the user. In some implementations, the one or more XR displays 312 are capable of presenting AR, MR, and/or VR content.

Figure 3B:
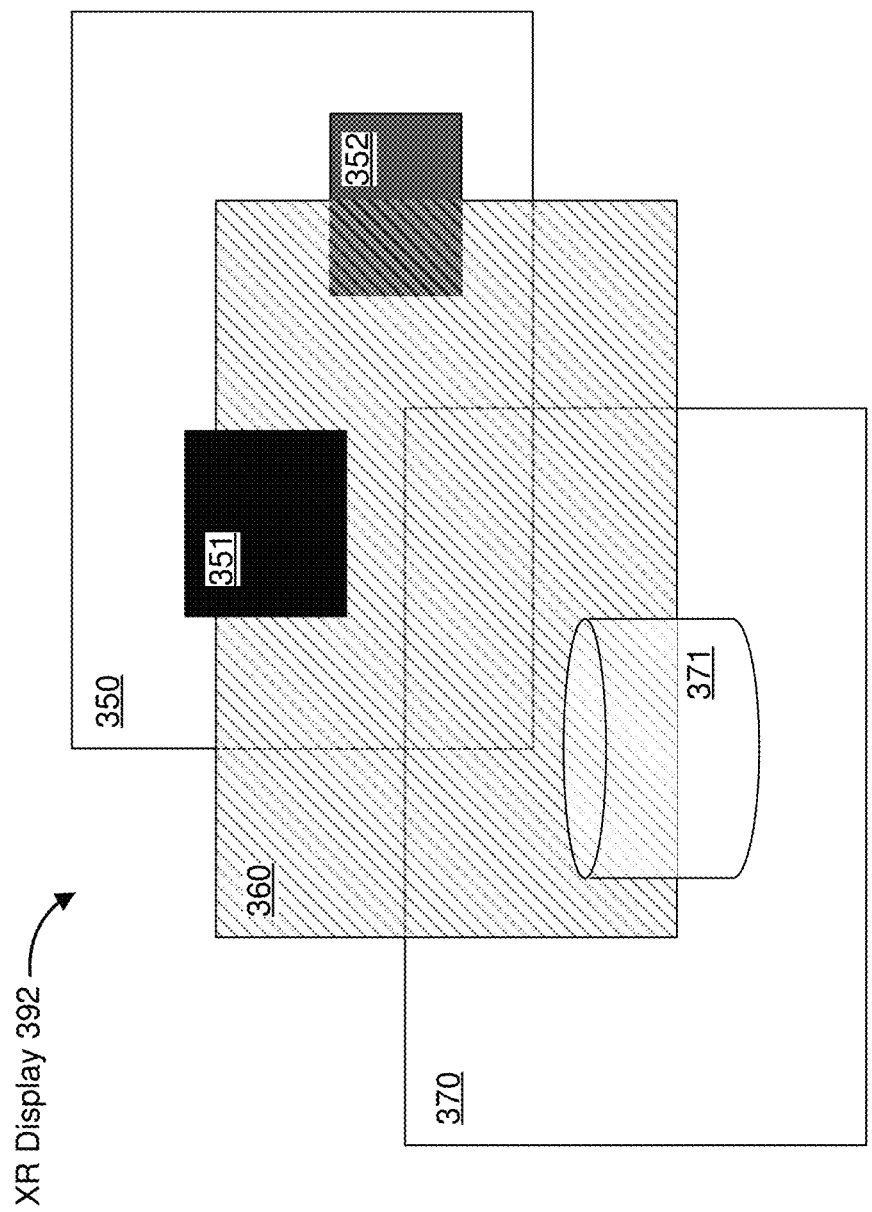
FIG. 3B is a blow-up view of an example XR display in accordance with some implementations.

In various implementations, the one or more XR displays 312 are video passthrough displays which display at least a portion of the physical environment 105 as an image captured by a scene camera. In various implementations, the one or more XR displays 312 are optical see-through displays which are at least partially transparent and pass light emitted by or reflected off the physical environment 105. FIG. 3B illustrates a blow-up view of an optical see-through XR display 392 in accordance with some implementations. In various implementations, the optical see-through XR display 392 includes a selectively occlusive layer 350 that includes a number of pixel elements that, when activated, block light from passing through the optical see-through XR display 392. Thus, through appropriate addressing of the selectively occlusive layer 350, the optical see-through XR display 392 can render a black region 351 or a gray region 352. In various implementations, the optical see-through XR display 392 includes a globally dimmable layer 360 that, according to a controllable dimming level, dims light passing through the optical see-through XR display 392. In various implementations, the globally dimmable layer 360 includes one or more of a photochromic element, electro-chromic element, an SPD (suspended-particle device) element, GHLC (guest-host liquid crystal) element, or PDLC (polymer-dispersed liquid-crystal) element. In various implementations, the optical see-through XR display 392 includes a light addition layer 370 that includes a number of pixel elements that, when activated, emit light towards the user. Thus, through appropriate addressing of the light addition layer 370, the optical see-through XR display 392 can render a white (or colored) virtual object 371. In various implementations, the optical see-through XR display 392 does not include each of the layers 350, 360, 370. In particular, in various implementations, the optical see-through XR display 392 does not include the selectively occlusive layer 350 and/or the globally dimmable layer 360. In various implementations, the optical see-through XR display 392 does not include the light addition layer 370 and/or the globally dimmable layer 360. In various implementations, the optical see-through XR display 392 does not include the selectively occlusive layer 350 and/or the light addition layer 370.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the physical environment as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, an animation rendering unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1A. To that end, in various implementations, the data obtaining unit 342 includes instructions and/or logic therefor, and heuristics and metadata therefor.

In some implementations, the animation rendering unit 344 is configured to receive a request to display an animation of an object exhibiting a response characteristic and, in response, render the animation, a modified version of the animation, or a replacement animation exhibiting the response characteristic. To that end, in various implementations, the animation rendering unit 344 includes instructions and/or logic therefor, and heuristics and metadata therefor.

In some implementations, the XR presenting unit 346 is configured to present XR content via the one or more XR displays 312. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the animation rendering unit 344, the XR presenting unit 346, and the data transmitting unit 348 are shown as residing on a single device (e.g., the HMD 120 of FIG. 1A), it should be understood that in other implementations, any combination of the data obtaining unit 342, the animation rendering unit 344, the XR presenting unit 346, and the data transmitting unit 348 may be located in separate computing devices.

Moreover, FIG. 3A is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3A could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIGS. 4A-4D illustrate an animation of an XR object (e.g., a virtual alert) on a video pass-through display in accordance with various implementations.

Figure 4A:
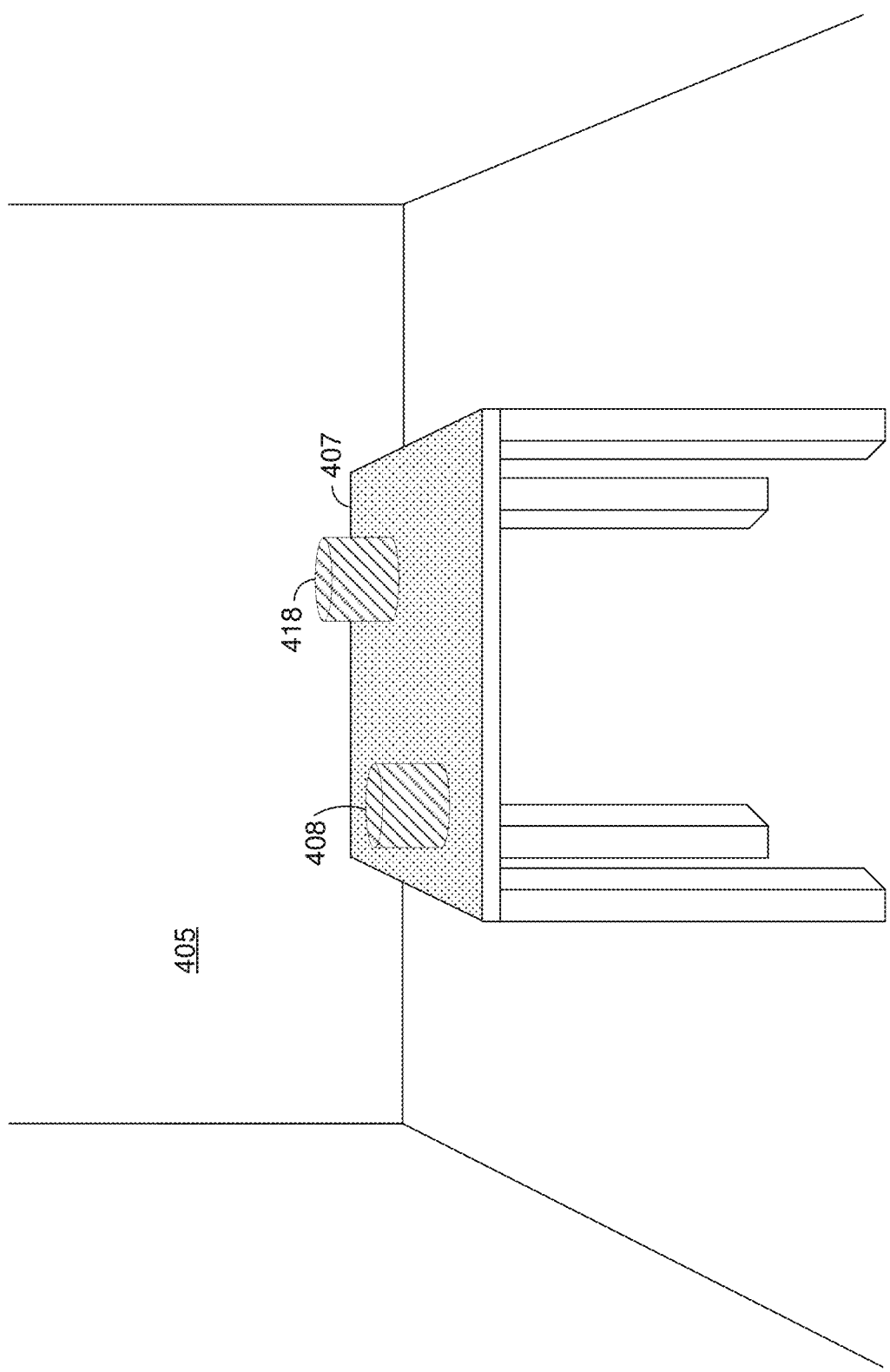
FIGS. 4A-4D illustrate an animation of a virtual alert on a video pass-through display in accordance with various implementations.

FIG. 4A illustrates a perspective view of a user in the physical environment 105 of FIG. 1A wearing an HMD with a video pass-through display at a first time. FIG. 4A includes a representation of the physical environment 405 (e.g., displayed on the video pass-through display) including a representation of the cylinder 408 on a representation of the table 407. The representation of the physical environment 405 also includes a virtual cylinder 418 (displayed by the HMD) upon the representation of the table 407.

Figure 4B:
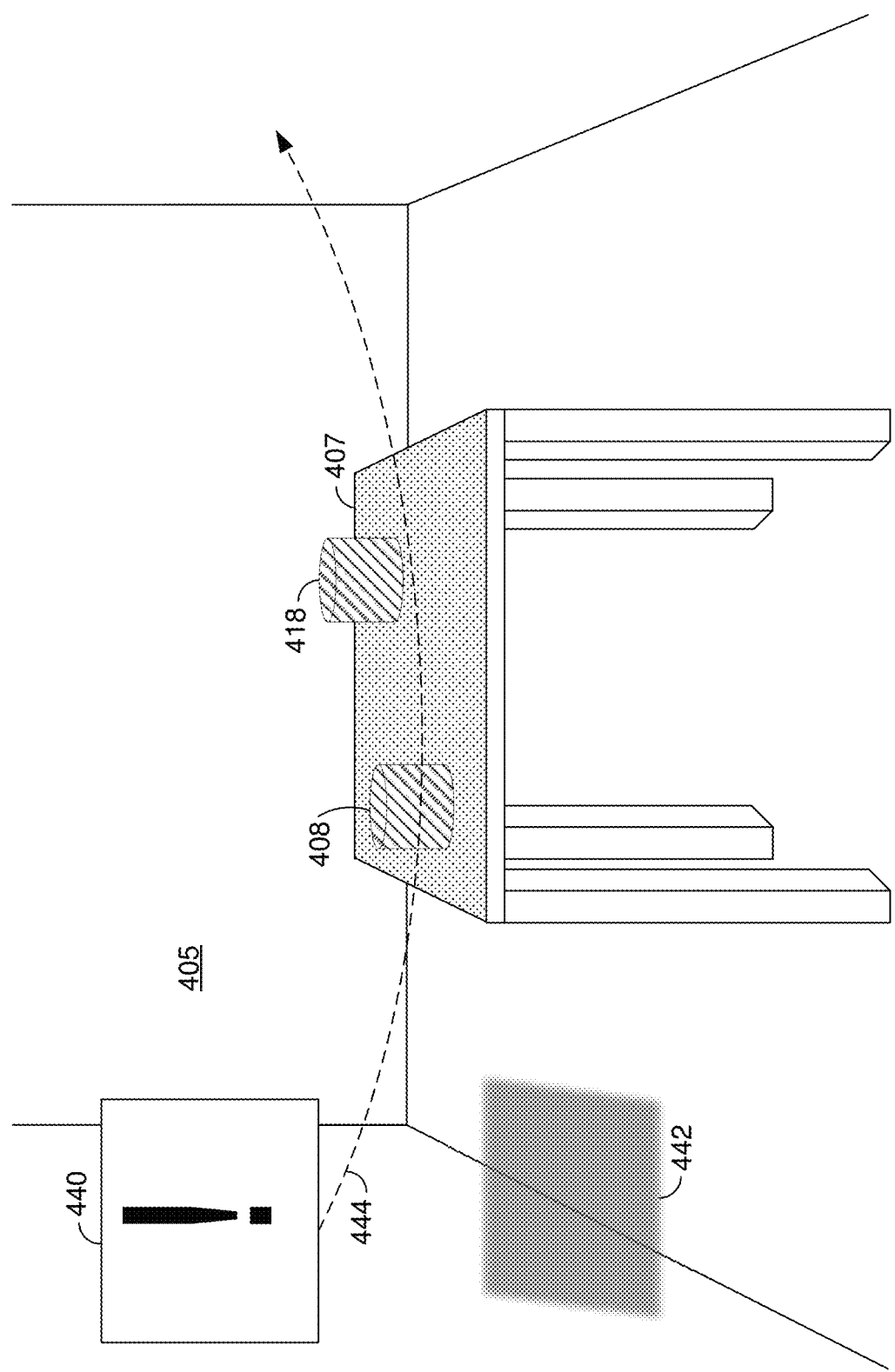

FIG. 4B illustrates the perspective view of FIG. 4A at a second time. In FIG. 4B, the representation of the physical environment 405 includes a virtual alert 440 which moves along a curved path 444. The representation of the physical environment 405 includes a shadow 442 of the virtual alert 440.

Figure 4C:
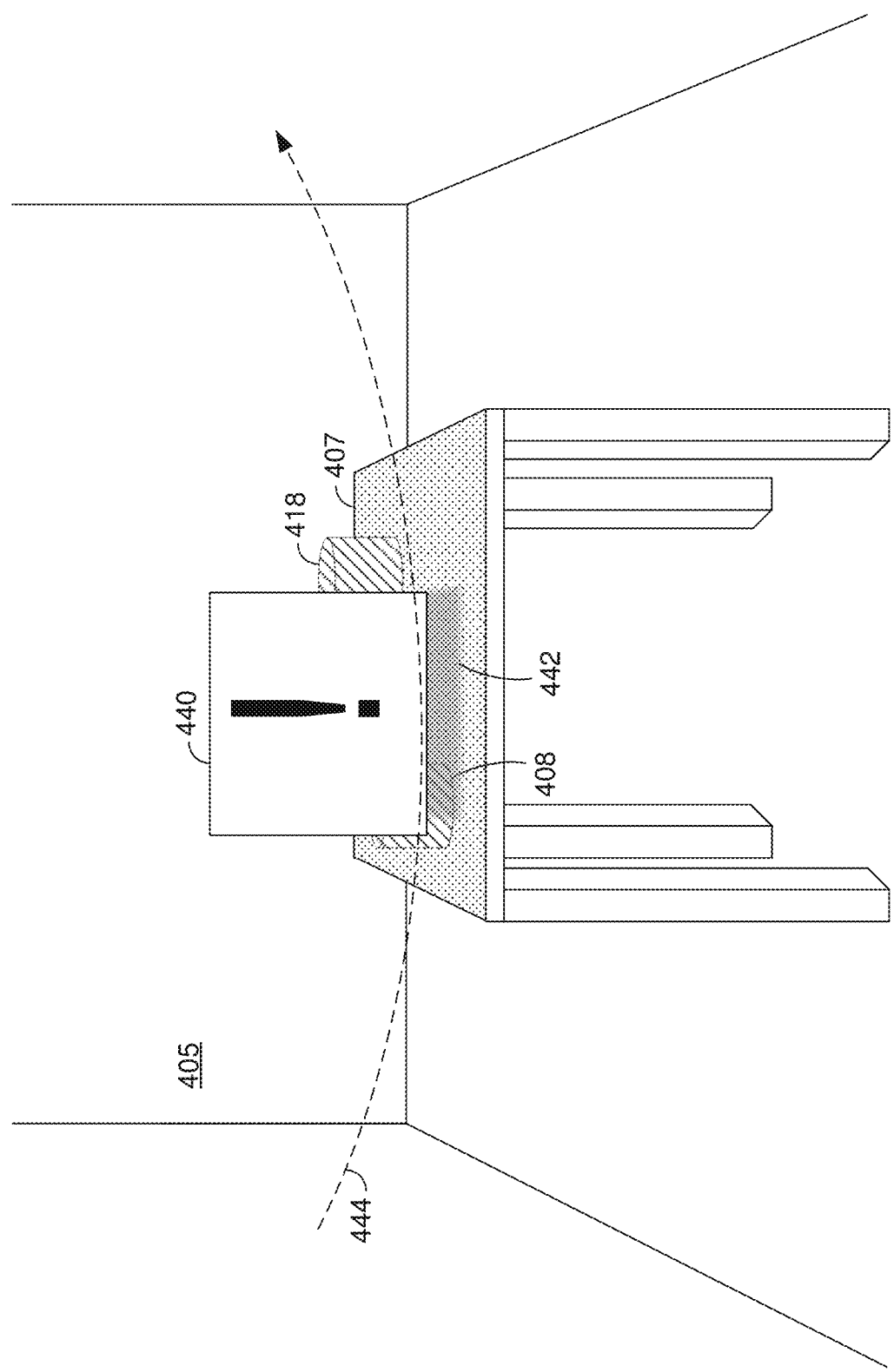

FIG. 4C illustrates the perspective view of FIG. 4A at a third time. In FIG. 4C, as compared to FIG. 4B, the virtual alert 440 has moved along the curved path 444. Similarly, the shadow 442 has moved to the top of the representation of the table 407.

Figure 4D:
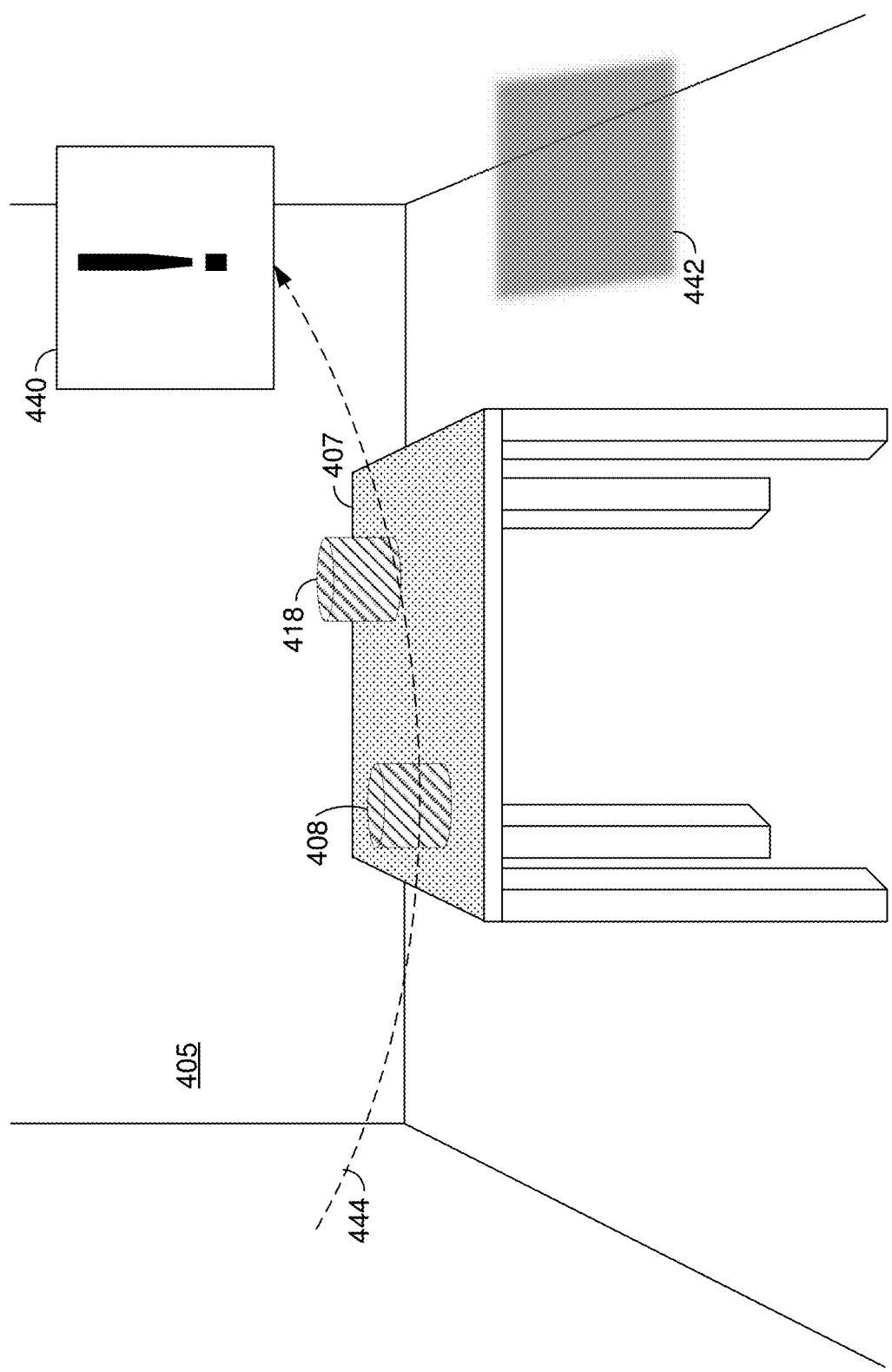

FIG. 4D illustrates the perspective view of FIG. 4A at a fourth time. In FIG. 4D, as compared to FIG. 4C, the virtual alert 440 has completed its motion along the curved path 444. Similarly, the shadow 442 is moved corresponding to the motion of the virtual alert 440.

FIGS. 5A-5D illustrate the animation of the virtual alert on an optical see-through display in accordance with various implementations.

FIG. 5A illustrates a perspective view of a user in the physical environment 105 of FIG. 1A wearing an HMD with an optical see-through display at a first time. FIG. 5A includes the physical environment 105 (e.g., as seen through the optical see-through display) including the cylinder 108 on the table 107. FIG. 5A also includes a virtual cylinder 118 (displayed by the HMD) upon the table 107.

Because the optical see-through display is an additive display, a portion 507 of the table 107 is visible through the virtual cylinder 118, whereas the table 107 is not visible through the real cylinder 108.

Figure 5B:
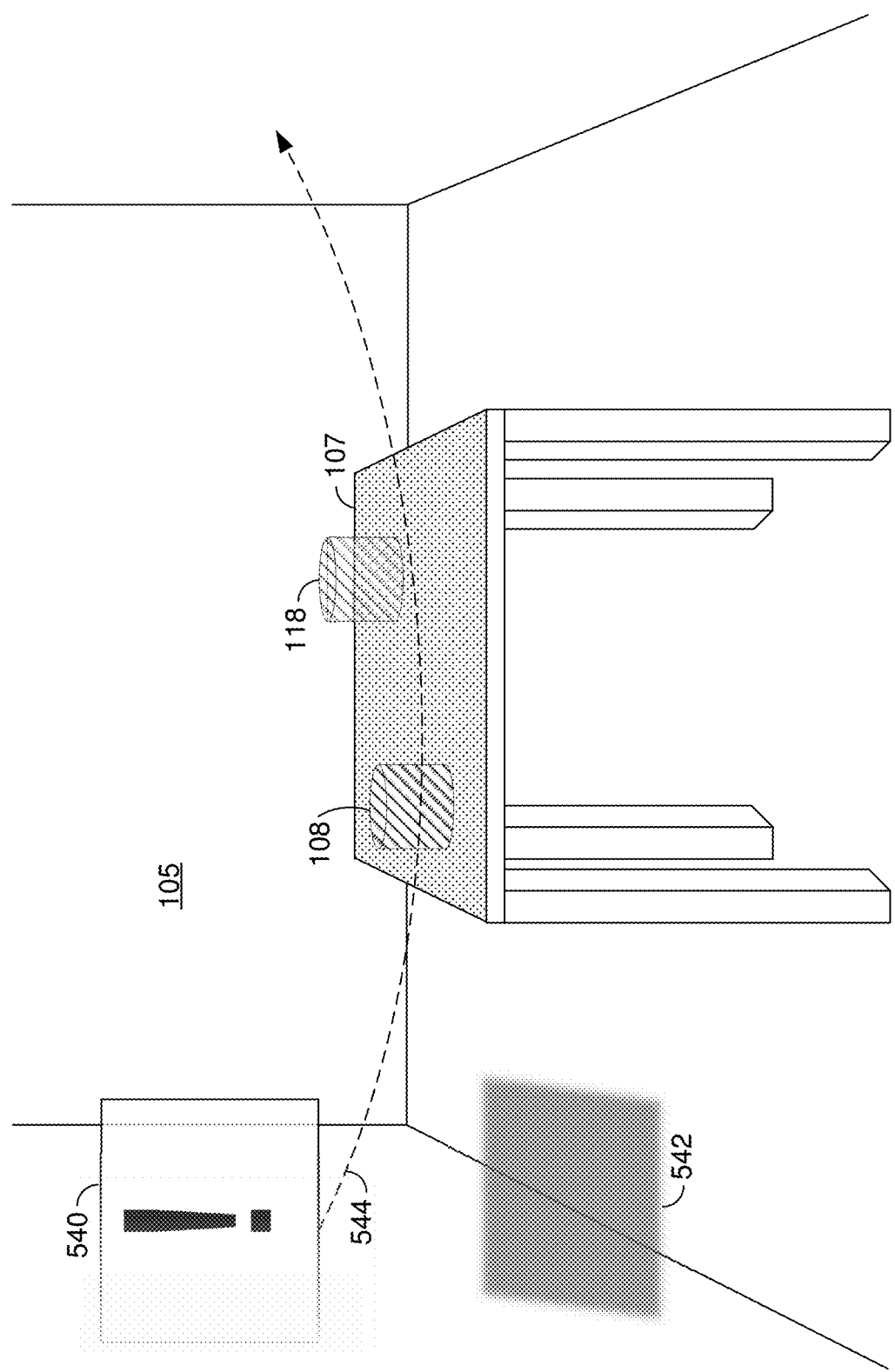

FIG. 5B illustrates the perspective view of FIG. 5A at a second time. FIG. 5B includes a virtual alert 540 which moves along a curved path 544. In various implementations, as shown in FIG. 5B, the virtual alert 540 is faded at an edge of the optical see-through display. In various implementations, fading virtual objects at the edge of the optical see-through display uses additional processing power of the HMD.

FIG. 5B further includes a shadow 542 of the virtual alert 540. In various implementations, because the optical see-through display is an additive display, rendering and displaying the shadow 542 on the optical see-through display uses more processing power of the HMD then rendering and displaying the shadow 442 of the virtual alert 440 on the video pass-through display in FIG. 4B. In various implementations, rendering and displaying the shadow 542 on the optical see-through display involves dimming a globally dimmable layer of the optical see-through display and brightening regions of the display that are not the shadow 542 using a light addition layer. In various implementations, rendering and displaying the shadow 542 on the optical see-through display involves brightening an outline of the shadow 542 on the optical see-through display using a light addition layer. In various implementations, rendering and displaying the shadow 442 of FIG. 4B on the video passthrough display involves darkening a region of the displayed image corresponding to the shadow 442.

FIG. 5C illustrates the perspective view of FIG. 5A at a third time. In FIG. 5C, as compared to FIG. 5B, the virtual alert 540 has moved along the curved path 544. Similarly, the shadow 542 has moved to the table 107.

Because the optical see-through display is an additive display, the real cylinder 108 is viewable through an overlap region 508 of the virtual alert 540 and the real cylinder 108. In various implementations (e.g., as illustrated in FIG. 6C, described below), the virtual cylinder 118 is not rendered and displayed at an overlap region 518 of the virtual alert 540 and the virtual cylinder 118. However, in implementations in which the real cylinder 108 is perceivable at the overlap region 508, but the virtual cylinder 118 is not perceivable at the overlap region 518, this difference in perception between the real cylinder 108 and the virtual cylinder 118 diminishes the perceived realism of the virtual cylinder 118. Accordingly, in various implementations (as illustrated in FIG. 5C), the virtual cylinder 118 is rendered and displayed at the overlap region 518. In various implementations, rendering and displaying a first virtual object behind a second virtual object at an overlap region of the first virtual object and the second virtual object on the optical see-through display uses additional processing power of the HMD. In various implementations, rendering and displaying the first virtual object behind the second virtual object at the overlap region on the optical see-through display involves modifying a transparency of the second virtual object at the overlap region. In various implementations, rendering and displaying the first virtual object behind the second virtual object at the overlap region on the optical see-through display involves modifying a brightness of the second virtual object at the overlap region or the brightness of the entire second virtual object. For example, if the second virtual object is a bright white which would use each light emitting pixel in the region of the second virtual object, at least a portion of the second virtual object (e.g., the overlap region or the entire second object) is dimmed so that light emitting pixels are available to render the first virtual object at the overlap region.

Figure 5D:
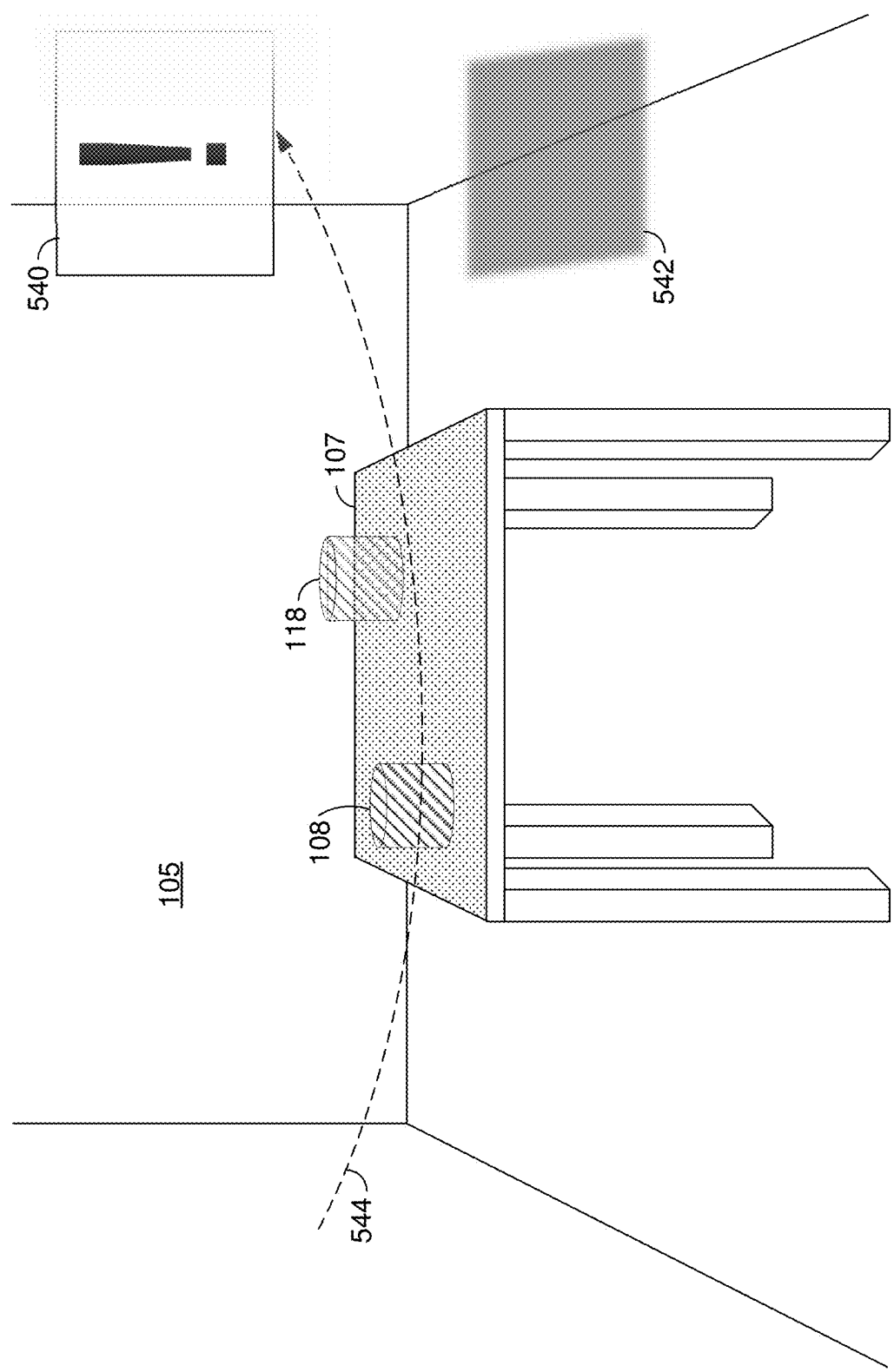

FIG. 5D illustrates the perspective view of FIG. 5A at a fourth time. In FIG. 5D, as compared to FIG. 5C, the virtual alert 540 has completed its motion along the curved path 544. Similarly, the shadow 542 is moved corresponding to the motion of the virtual alert 540.

In various implementations, the amount of processing power to be used in rendering and displaying a requested animation on an optical see-through display is greater than the amount of available processing power of the HMD. For example, in various implementations, the HMD is unable to render the animation as shown in FIGS. 5A-5D. Accordingly, in various implementations, the HMD simplifies the animation to reduce the amount of processing power used to render and display the animation.

Whereas FIGS. 5A-5D illustrate a first animation of an object exhibiting a response characteristic, FIGS. 6A-6D illustrate a second animation (a modification of the first animation) of the object exhibiting the response characteristic. FIGS. 6A-6D illustrate a modified animation of the virtual alert on the optical see-through display in accordance with various implementations.

Figure 6A:
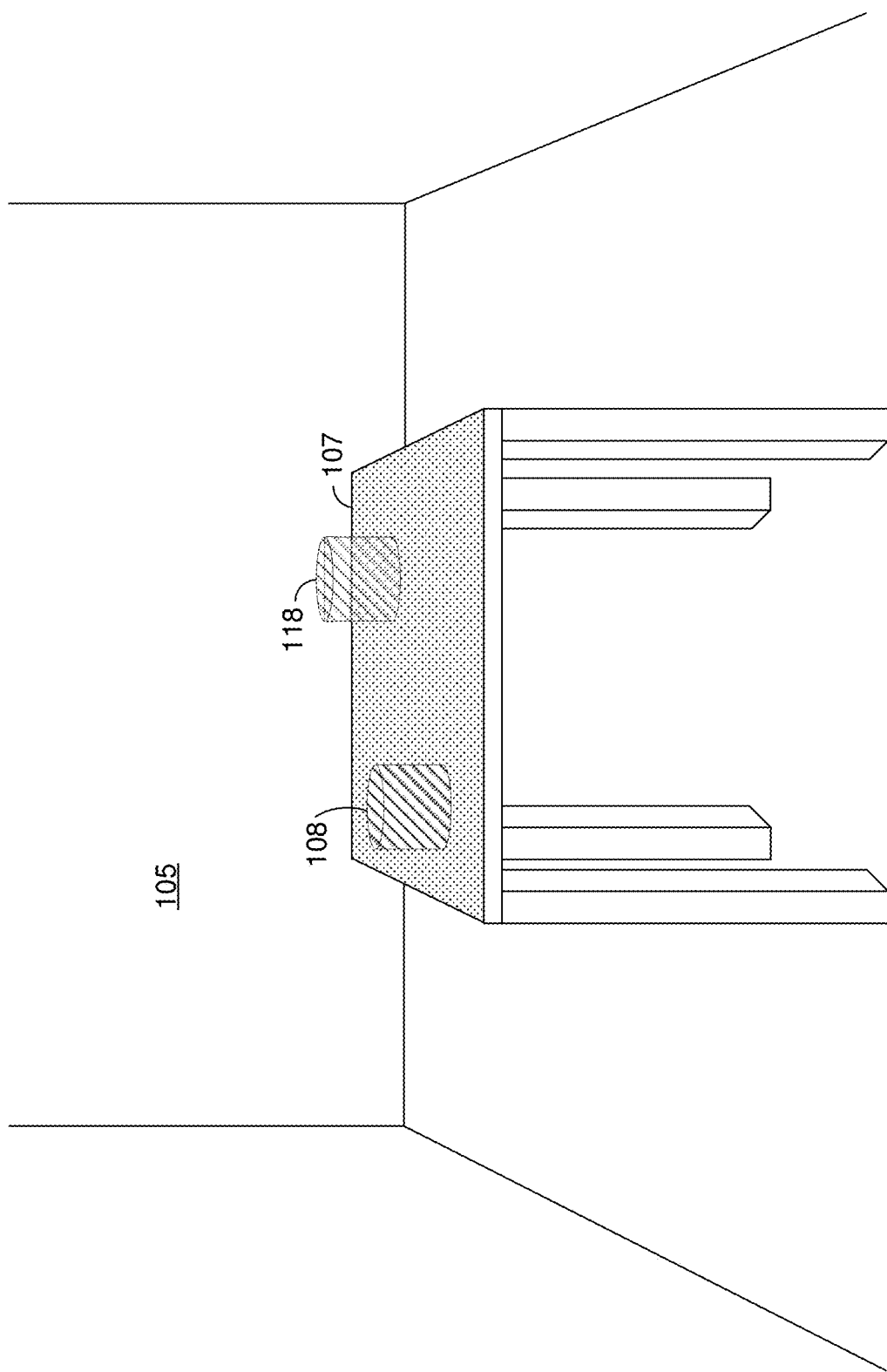
FIGS. 6A-6D illustrate a modified animation of the virtual alert on the optical see-through display in accordance with various implementations.

FIG. 6A illustrates a perspective view of a user in the physical environment 105 of FIG. 1A wearing an HMD with an optical see-through display at a first time. FIG. 6A includes the physical environment 105 (e.g., as seen through the optical see-through display) including the cylinder 108 on the table 107. FIG. 6A also includes a virtual cylinder 118 (displayed by the HMD) upon the table 107.

Figure 6B:
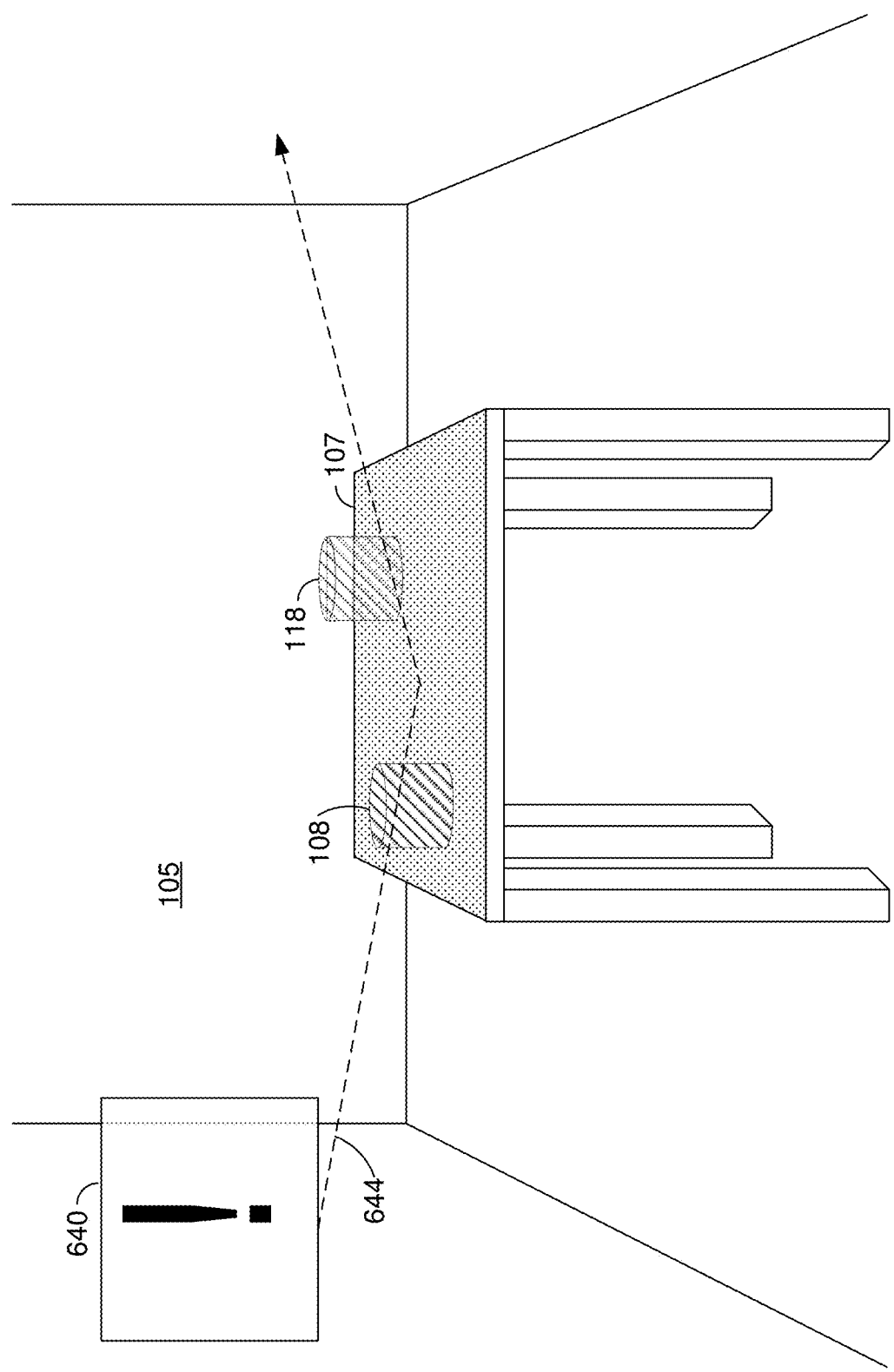
Figure 6C:
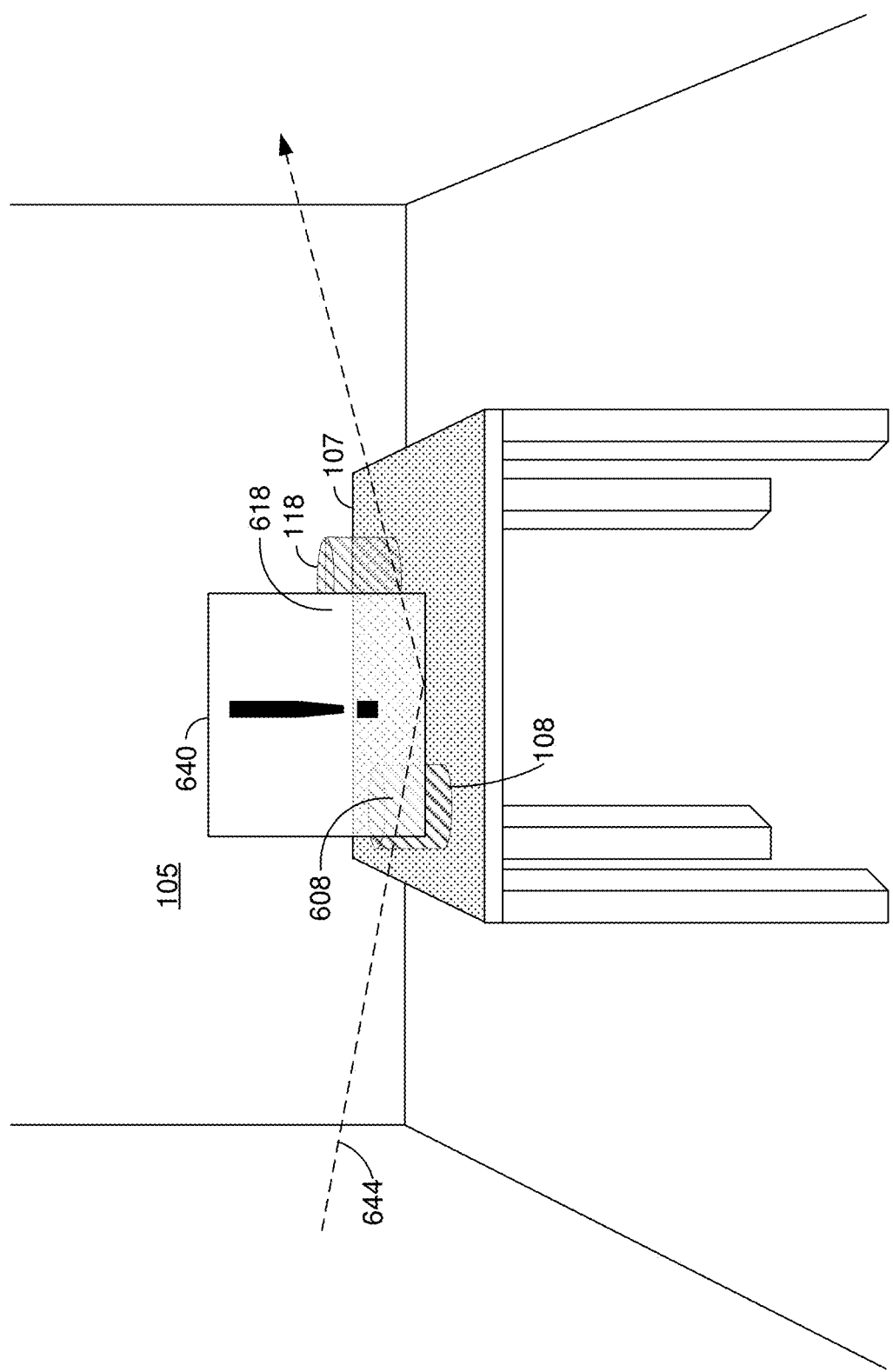

FIG. 6B illustrates the perspective view of FIG. 6A at a second time. FIG. 6B includes a virtual alert 640 which moves along a piecewise linear path 644. In various implementations, rendering and displaying the virtual alert 640 moving along the piecewise linear path 644 on the optical see-through display uses less processing power of the HMD than rendering and displaying the virtual alert 540 moving along the curved path 544 on the optical see-through display as shown in FIG. 5B. In various implementations, rendering and displaying the virtual alert 640 without fading the virtual alert at the edge of the optical see-through display uses less processing power of the HMD than rendering and displaying the virtual alert 540 with faded edges on the optical see-through display as shown in FIG. 5B. In various implementations, rendering and displaying the virtual alert 640 without a shadow on the optical see-through display uses less processing power of the HMD than rendering and displaying the virtual alert 540 with the shadow 542 on the optical see-through display as shown in FIG. 5B.

FIG. 6C illustrates the perspective view of FIG. 6A at a third time. In FIG. 6C, as compared to FIG. 6B, the virtual alert 640 has moved along the piecewise linear path 644. Because the optical see-through display is an additive display, the real cylinder 108 is viewable through an overlap region 608 of the virtual alert 640 and the real cylinder 108. In various implementations (e.g., as illustrated in FIG. 6C), the virtual cylinder 118 is not rendered and displayed at an overlap region 618 of the virtual alert 640 and the virtual cylinder 118. In various implementations, rendering and displaying the virtual alert 640 without modifying the virtual alert 640 at the overlap region 618 uses less processing power of the HMD than rendering and displaying the virtual alert 540 with the virtual cylinder 118 visible at the overlap region 518 on the optical see-through display as shown in FIG. 5C.

Figure 6D:
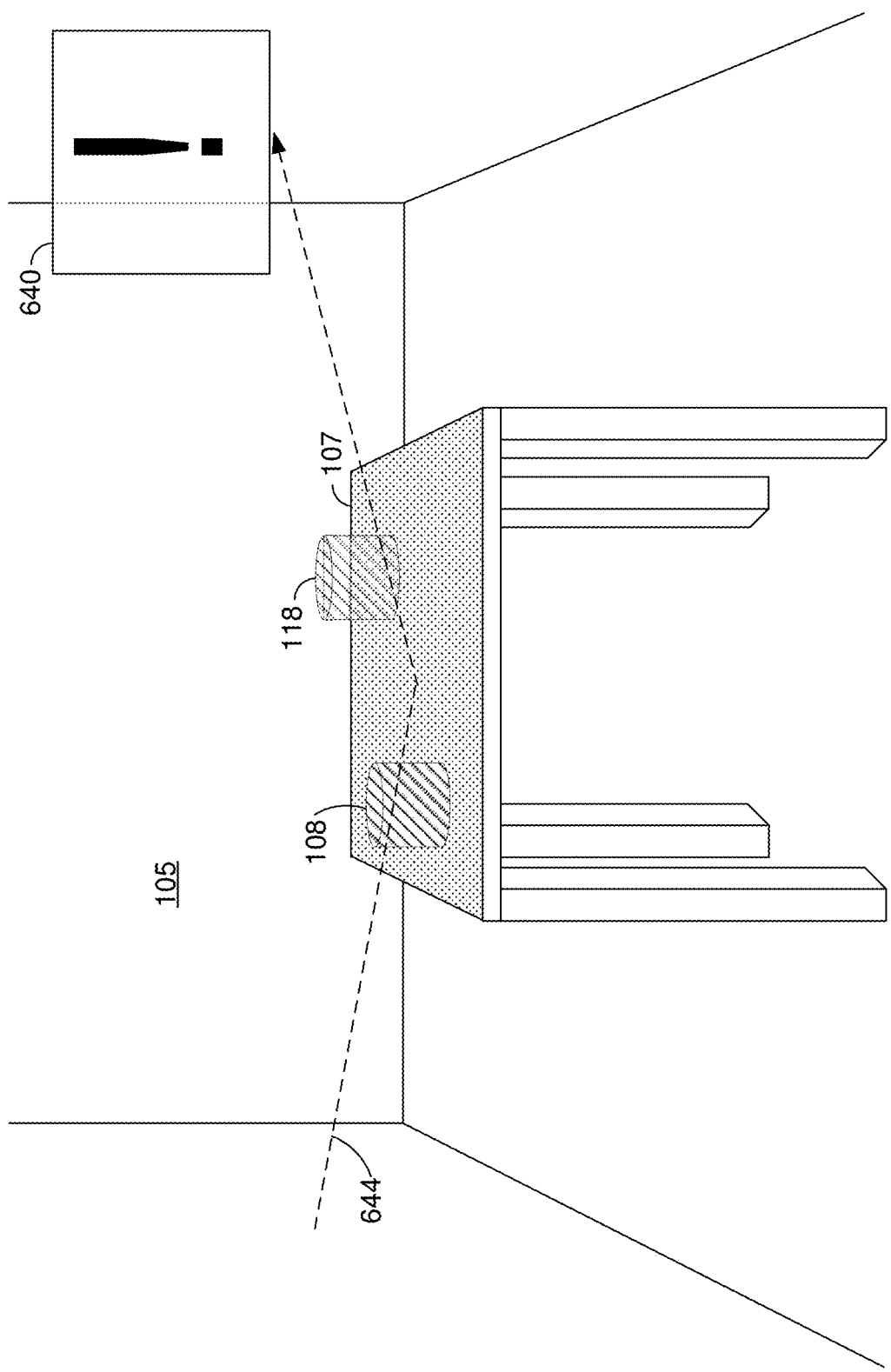

FIG. 6D illustrates the perspective view of FIG. 6A at a fourth time. In FIG. 6D, as compared to FIG. 6C, the virtual alert 640 has completed its motion along the piecewise linear path 644.

In various implementations, the second animation of FIGS. 6A-6D is rendered and displayed at a lower resolution than the first animation of FIGS. 5A-5D. In various implementations, rendering and displaying the second animation at the lower resolution uses less processing power of the HMD. In various implementations, the second animation of FIGS. 6A-6D is rendered and displayed at a lower frame rate than the first animation of FIGS. 5A-5D. In various implementations, rendering and displaying the second animation at the lower frame rate uses less processing power of the HMD. In various implementations, rendering and displaying the second animation of FIGS. 6A-6D is rendered and displayed at a lower color quantization than the first animation of FIGS. 5A-5D. In various implementations, rendering and displaying the second animation at the lower color quantization uses less processing power of the HMD.

Whereas FIGS. 5A-5D illustrate a first animation of an object exhibiting a response characteristic and FIGS. 6A-6D illustrate a second animation (a modification of the first animation) of the object exhibiting the response characteristic, FIGS. 7A-7D illustrate a third animation (a substitute for the first animation) of the object exhibiting the response characteristic. FIGS. 7A-7D illustrate a substitute animation of the virtual alert on the optical see-through display in accordance with various implementations.

In various implementations, an application executed by the HMD generates a request to display an animation of the object exhibiting a response characteristic. In various implementations, the request includes an auxiliary request to display a substitute animation of the object exhibiting the response characteristic if the HMD is unable to display the animation of the object exhibiting the response characteristic. In various implementations, if the HMD is unable to display the animation of the object exhibiting the response characteristic, the HMD denies the request and, in response, the application generates a request to display the substitute animation exhibiting the response characteristic.

Figure 7A:
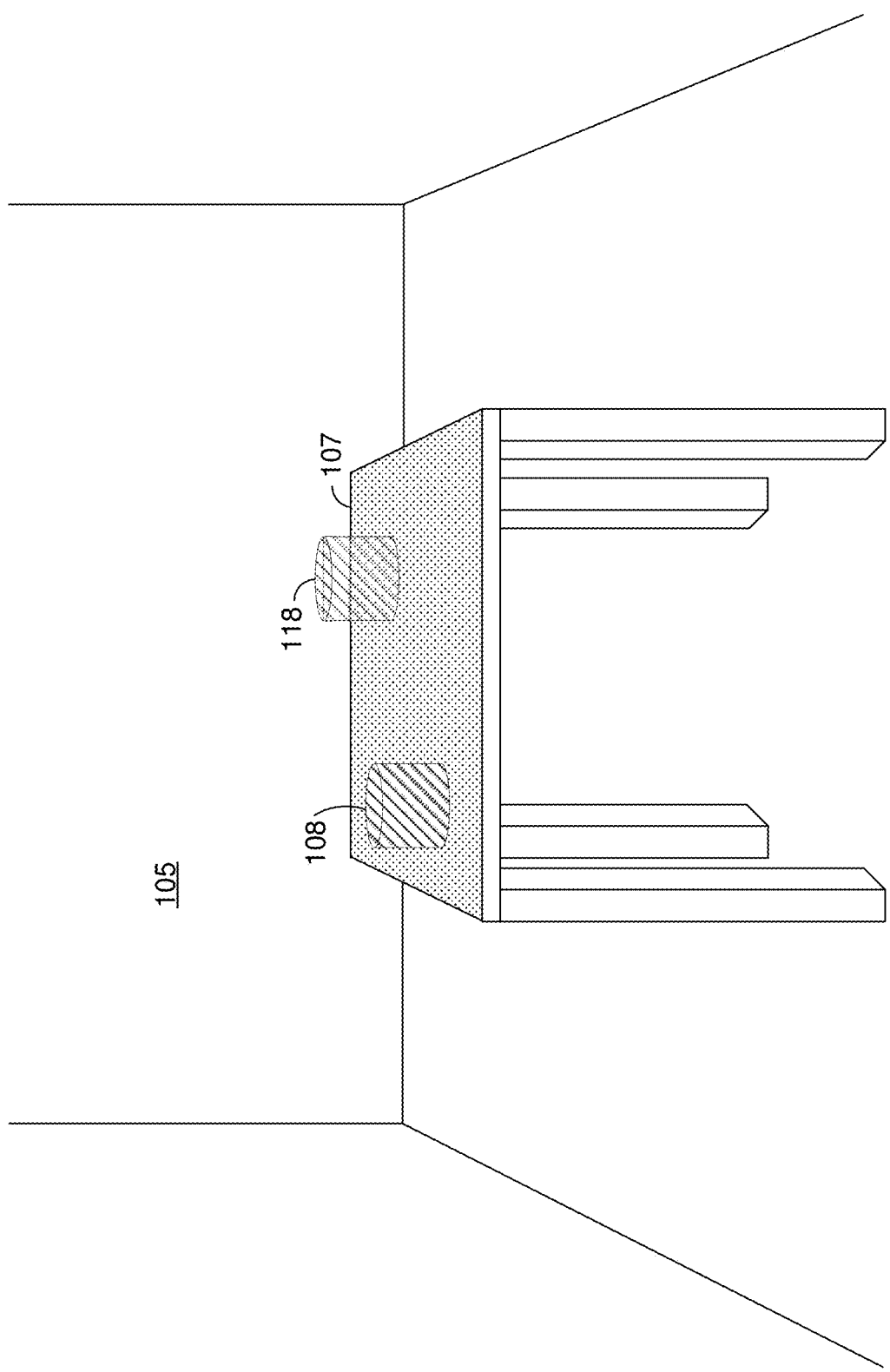

FIG. 7A illustrates a perspective view of a user in the physical environment 105 of FIG. 1A wearing an HMD with an optical see-through display at a first time. FIG. 7A includes the physical environment 105 (e.g., as seen through the optical see-through display) including the cylinder 108 on the table 107. FIG. 7A also includes a virtual cylinder 118 (displayed by the HMD) upon the table 107.

Figure 7C:
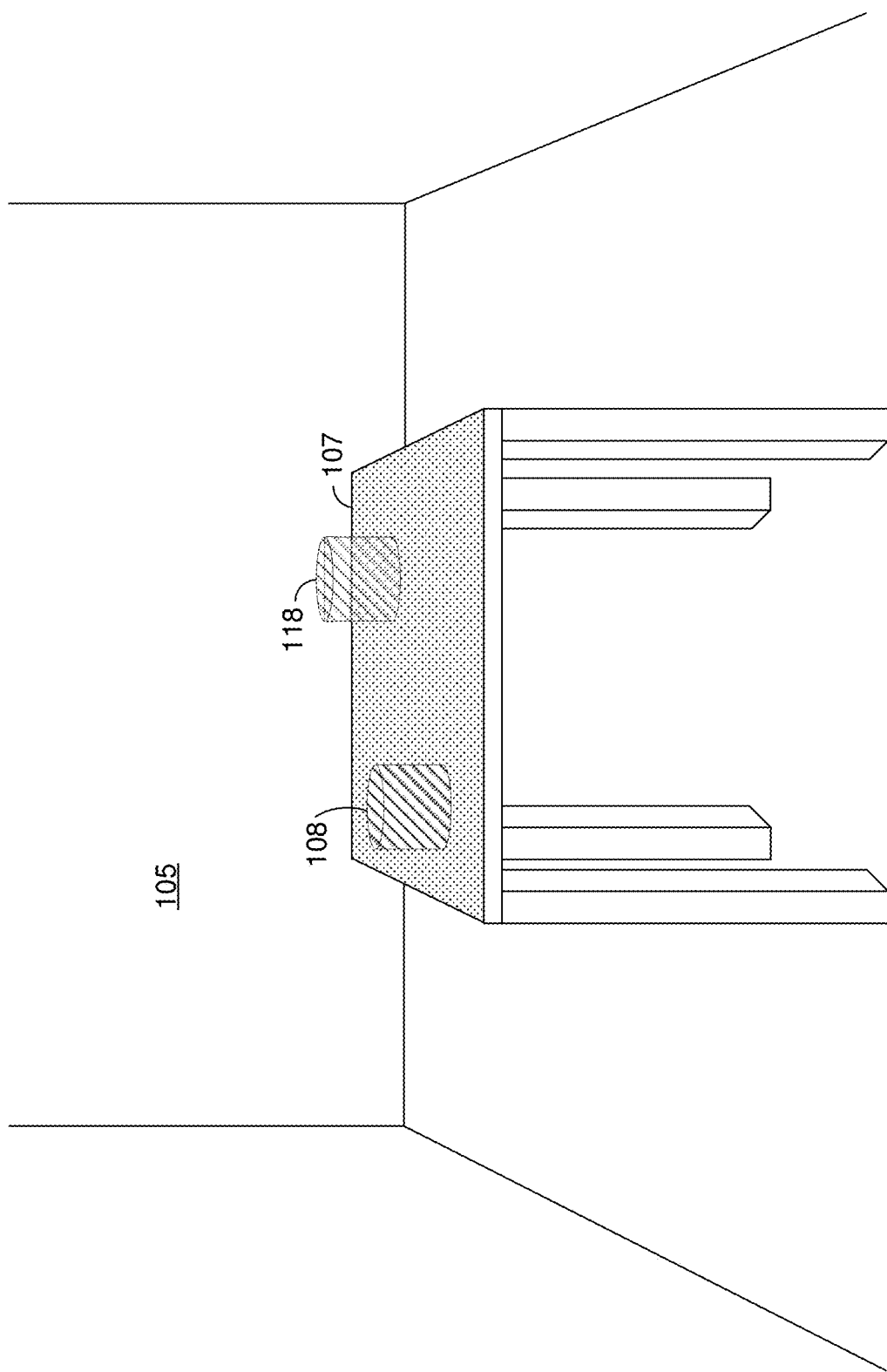
Figure 7D:
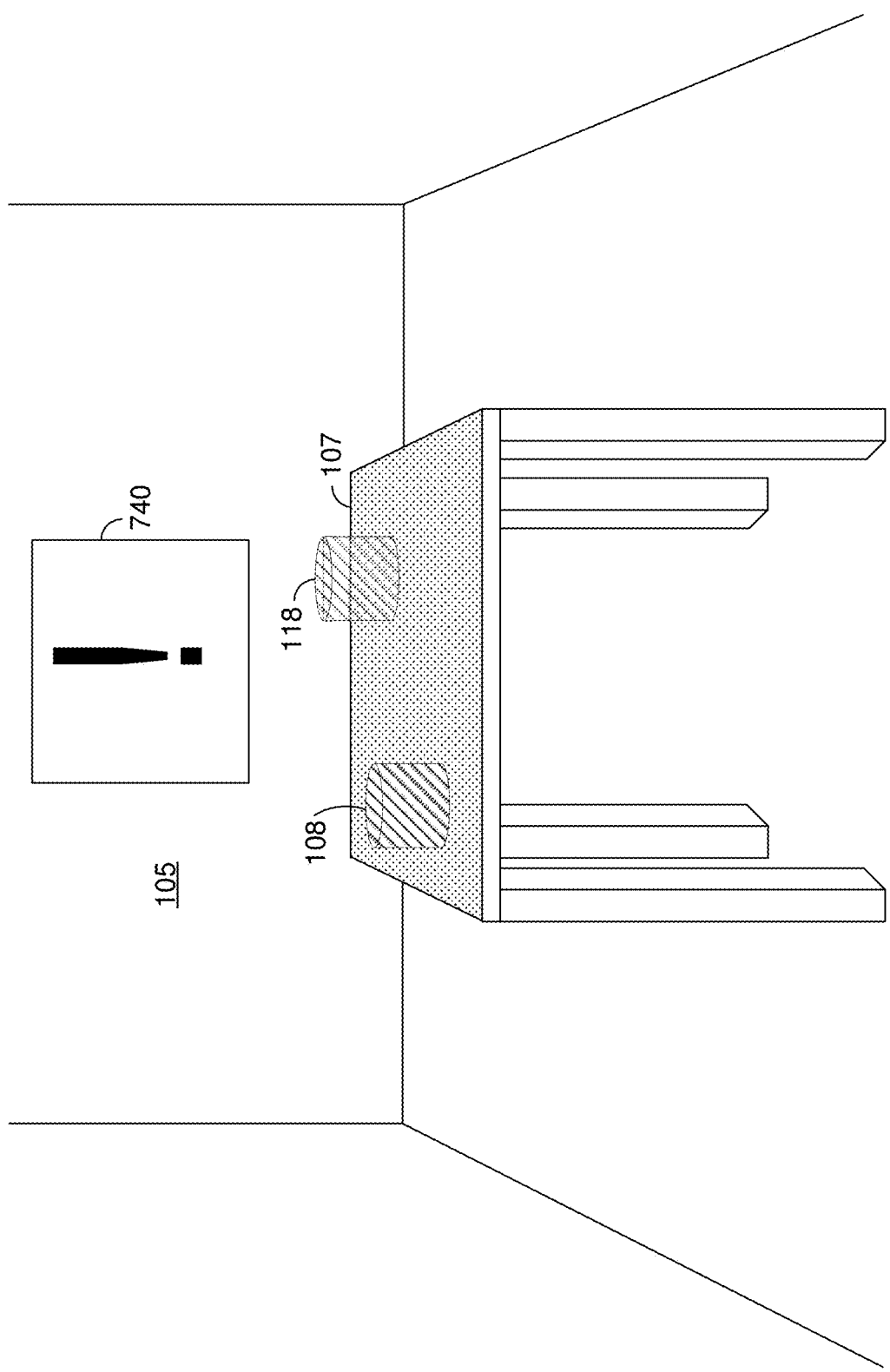

FIG. 7B illustrates the perspective view of FIG. 7A at a second time. FIG. 7B includes a virtual alert 740 which blinks (e.g., is repeatedly displayed and not displayed). FIG. 7C illustrates the perspective view of FIG. 7A at a third time. In FIG. 7C, as compared to FIG. 7B, the virtual alert 740 is not displayed. FIG. 7D illustrates the perspective view of FIG. 7A at a fourth time. In FIG. 7D, as compared to FIG. 7C, the virtual alert 740 is, again, displayed.

In various implementations, rendering and displaying the third animation of FIGS. 7A-7D on the optical see-through display uses less processing power of the HMD than rendering and displaying the second animation of FIGS. 6A-6D and/or the first animation of FIGS. 5A-5D.

FIG. 8 is a flowchart representation of a method 800 of displaying an animation of an object exhibiting a response characteristic in accordance with some implementations. In various implementations, the method 800 is performed by a device with an optical see-through display, one or more processors, and a non-transitory memory (e.g., the HMD 120 of FIG. 3). In some implementations, the method 800 is performed by processing logic, including hardware, firmware, software, or a combination thereof. In some implementations, the method 800 is performed by a processor executing instructions (e.g., code) stored in a non-transitory computer-readable medium (e.g., a memory).

The method 800 begins, in block 810, with the device obtaining a request to display a first animation of an object exhibiting a response characteristic. In various implementations, the request is obtained from an application executed by the device. In various implementations, the request is obtained from a portion of an animation pipeline of an application executed by the device that includes the portion that generates the request, a portion that renders the animation, and a portion that displays the animation. Thus, in various implementations, obtaining the request includes generating, by the device, the request. In various implementations, obtaining the request includes receiving the request from an external device, e.g., over a communications interface or network interface.

In various implementations, the response characteristic is an action that the object appears to perform. In various implementations, the response characteristic includes moving from a first location to a second location. In various implementations, the response characteristic includes spinning about an axis. In various implementations, the response characteristic includes swinging a baseball bat, kicking a football, or punching a bag. In various implementations, the response characteristic includes dancing, eating a sandwich, or driving a car.

In various implementations, the response characteristic includes providing information to a user, such as alerting a user, notifying a user, informing a user, etc. In various implementations, the response characteristic includes evoking an emotion of a user, such as dimming a light (e.g., to evoke calmness) or flashing a light (e.g., to evoke excitement).

The method 800 continues, in block 820, with the device determining a metric characterizing an amount of processing power for the device to display the first animation on the optical see-through display. In various implementations, the metric is or is based on an amount of processing power for the device to display the first animation on the optical see-through display. In various implementations, the metric is indicative of an amount of processing power it would take to render and display the first animation as requested. In various implementations, the metric is indicative of an amount of processing power necessary, needed, or required to render and display the first animation as requested. In various implementations, the metric depends on the content currently being displayed. For example, in various implementations, the metric is greater due to modification of overlap regions when other objects are being displayed in the XR environment. Thus, in various implementations, determining the metric is based on the content currently being displayed.

In various implementations, determining the metric includes determining an amount of processing power for the device to modify the first animation for display in an optical see-through mode. In various implementations, determining the metric includes determining a first amount of processing power for the device to display the first animation in a video pass-through display mode and determining a second amount of processing power for the device to modify the first animation for display in an optical see-through mode. In various implementations, the metric is the second amount of processing power added to the first amount of processing power.

In various implementations, determining the amount of processing power to modify the first animation for display in the optical see-through mode includes determining an amount of processing power for shadow rendering. For example, rendering and displaying the shadow 542 in FIG. 5B uses more processing power than rendering and displaying the shadow 442 in FIG. 4B. In various implementations, determining the amount of processing power to modify the first animation for display in the optical see-through mode includes determining an amount of processing power for coherent occlusion. For example, rendering and displaying the virtual alert 540 including the partially transparent overlap region 518 in FIG. 5C uses more processing power than displaying the virtual alert 440 in FIG. 4C. In various implementations, determining the amount of processing power to modify the first animation for display in the optical see-through mode includes determining an amount of processing power for edge fading. For example, displaying the virtual alert 540 with fading at the edge of the optical see-through display in FIG. 5D uses more processing power than displaying the virtual alert 440 without such fading in FIG. 4D.

The method 800 continues, in block 830, with the device, in response to a determination that the metric exceeds a threshold associated with the device, selecting a second animation of the object exhibiting the response characteristic. In various implementations, the threshold associated with the device is (or is based on) an amount of available processing power of the device. In various implementations, the amount of available processing power depends on the content currently being displayed. Thus, in various implementations, determining the amount of available processing power is based on the content currently being displayed. In various implementations, the amount of available processing power is a processing power bandwidth (e.g., an amount of processing power per unit time).

In various implementations, selecting the second animation includes modifying the first animation. For example, the second animation of FIGS. 6A-6D is a modification of the first animation of FIGS. 5A-5D.

In various implementations, modifying the first animation includes at least one of reducing a resolution of the first animation, reducing a frame rate of the first animation, or reducing a color quantization of the first animation. In various implementations, modifying the first animation includes at least one of removing shadows from the first animation or removing overlap regions from the first animation. For example, in FIG. 5C, the HMD displays the shadow 542 and the overlap region 518. However, in FIG. 6C, the HMD does not display a shadow of the virtual alert 640 or an overlap region 618 that differs from the virtual alert 640. In various implementations, modifying the first animation includes linearizing motion of the first animation. For example, in FIGS. 5B-5D, the virtual alert 540 moves along the curved path 544. However, in FIGS. 6B-6D, the virtual alert 640 moves along the piecewise linear path 644.

In various implementations, selecting the second animation includes selecting a substitute animation (or replacement animation or alternative animation). For example, the third animation of FIGS. 7A-7D is a substitute animation of the first animation of FIGS. 5A-5D.

In various implementations, the request to display the first animation includes an auxiliary request to display the second animation, e.g., if the amount of processing power exceeds the threshold associated with the device. In various implementations, the request includes a hierarchical set of animations of the object exhibiting the response characteristic, each associated with an amount of processing power for the device to display the animation. In various implementations, the device selects that animation highest in the hierarchy for which the amount of processing power is below the threshold.

In various implementations, the method 800 includes denying the request to display the first animation and, in response to denying the request to display the first animation, receiving a request to display the second animation.

In various implementations, selecting the second animation includes selecting a video pass-through animation including the first animation. The video pass-through animation is a modification of the first animation modified to include the first animation and at least one or more images of the physical environment (and, in various implementations, other XR content). Thus, in response to a determination that the metric exceeds a threshold, the device displays the animation on a video pass-through display (e.g., by transitioning a transitional display between an optical see-through display mode and a video pass-through display mode).

The method 800 continues, in block 840, with the device displaying the second animation. In various implementations, the device displays the second animation on the optical see-through display (or on a transitional display in an optical see-through display mode). In various implementations, the device displays the second animation on a video pass-through display (or on a transitional display in a video pass-through display mode).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a display, one or more processors, and a non-transitory memory:
    receiving a request to display a first animation of a virtual object exhibiting a response characteristic;
    determining a metric characterizing an amount of processing power for the device to display the first animation in an optical see-through display mode;

in response to a determination that the metric exceeds a threshold associated with the device, selecting a second animation of the virtual object exhibiting the response characteristic; and displaying, on the display, the second animation.

2. The method of claim 1, wherein determining the metric includes determining an amount of processing power for the device to modify the first animation for display in the optical see-through display mode.

3. The method of claim 2, wherein determining the amount of processing power for the device to modify the first animation includes determining at least one of an amount of processing power for shadow rendering, an amount of processing power for coherent occlusion, or an amount of processing power for edge fading.

4. The method of claim 1, wherein determining the metric is based on content displayed by the device.

5. The method of claim 1, wherein the threshold associated with the device is based on an amount of available processing power of the device.

6. The method of claim 5, wherein the amount of available processing power is based on content displayed by the device.

7. The method of claim 1, wherein selecting the second animation includes modifying the first animation.

8. The method of claim 7, wherein modifying the first animation includes at least one of reducing a resolution of the first animation, reducing a frame rate of the first animation, or reducing a color quantization of the first animation.

9. The method of claim 7, wherein modifying the first animation includes at least one of removing shadows from the first animation or removing overlap regions from the first animation.

10. The method of claim 7, wherein modifying the first animation includes linearizing motion of the first animation.

11. The method of claim 1, wherein the request to display the first animation includes an auxiliary request to display the second animation.

12. The method of claim 1, further comprising:
denying the request to display the first animation; and
in response to denying the request to display the first animation, receiving a request to display the second animation.

13. The method of claim 1, wherein selecting the second animation includes selecting a video pass-through animation including the first animation and wherein displaying the second animation includes displaying the second animation in a video pass-through display mode.

14. A device comprising:
a display;
a non-transitory memory; and
one or more processors to:
receive a request to display a first animation of a virtual object exhibiting a response characteristic;
determine a metric characterizing an amount of processing power for the device to display the first animation in an optical see-through display mode;
in response to a determination that the metric exceeds a threshold associated with the device, select a second animation of the virtual object exhibiting the response characteristic; and
display, on the display, the second animation.

15. The device of claim 14, wherein the one or more processors are to determine the metric by determining an amount of processing power for the device to modify the first animation for display in the optical see-through display mode.

16. The device of claim 14, wherein the threshold associated with the device is based on an amount of available processing power of the device.

17. The device of claim 14, wherein the one or more processors are to select the second animation by modifying the first animation.

18. The device of claim 17, wherein the one or more processors are to modify the first animation by reducing at least one of a resolution of the first animation, a frame rate of the first animation, or a color quantization of the first animation.

19. The device of claim 17, wherein the one or more processors are to modify the first animation by linearizing motion of the first animation.

20. A non-transitory memory storing one or more programs, which, when executed by one or more processors of a device with a display, cause the device to:
receive a request to display a first animation of a virtual object exhibiting a response characteristic;
determine a metric characterizing an amount of processing power for the device to display the first animation in an optical see-through display mode;
in response to a determination that the metric exceeds a threshold associated with the device, select a second animation of the virtual object exhibiting the response characteristic; and
display, on the display, the second animation.

21. The non-transitory memory of claim 20, wherein the one or more programs, when executed by the one or more processors, cause the device to determine the metric by determining an amount of processing power for the device to modify the first animation for display in the optical see-through display mode.

22. The non-transitory memory of claim 20, wherein the threshold associated with the device is based on an amount of available processing power of the device.

23. The non-transitory memory of claim 20, wherein the one or more programs, when executed by the one or more processors, cause the device to select the second animation by modifying the first animation.

24. The non-transitory memory of claim 23, wherein the one or more programs, when executed by the one or more processors, cause the device to modify the first animation by reducing at least one of a resolution of the first animation, a frame rate of the first animation, or a color quantization of the first animation.

25. The non-transitory memory of claim 23, wherein the one or more programs, when executed by the one or more processors, cause the device to modify the first animation by linearizing motion of the first animation.

* * * * *